US007818014B2

(12) United States Patent
Takizawa et al.

(10) Patent No.: US 7,818,014 B2
(45) Date of Patent: Oct. 19, 2010

(54) WIRELESS COMMUNICATION SYSTEM, ACCESS POINT AND WIRELESS STATION COMPOSING THE WIRELESS COMMUNICATION SYSTEM, AND COMMUNICATION LOAD BALANCING METHOD FOR ACCESS POINT

(75) Inventors: Masaaki Takizawa, Fukushima-ken (JP); Tsutomu Suzuki, Fukushima-ken (JP)

(73) Assignee: Hitachi, Ltd., Tokyo (JP)

( * ) Notice: Subject to any disclaimer, the term of this patent is extended or adjusted under 35 U.S.C. 154(b) by 777 days.

(21) Appl. No.: 11/391,334

(22) Filed: Mar. 29, 2006

(65) Prior Publication Data

US 2006/0234720 A1 Oct. 19, 2006

(30) Foreign Application Priority Data

Apr. 14, 2005 (JP) ............................. 2005-116900

(51) Int. Cl.
*H04W 72/00* (2009.01)
(52) U.S. Cl. ...................... 455/453; 455/437; 455/442; 455/67.11; 370/328; 370/331; 370/338
(58) Field of Classification Search ................ 455/453, 455/525, 67.11, 423, 41.2, 436, 442; 370/331–333, 370/328, 338
See application file for complete search history.

(56) References Cited

U.S. PATENT DOCUMENTS

| 5,497,504 | A * | 3/1996 | Acampora et al. ........... 455/436 |
| 5,729,531 | A * | 3/1998 | Raith et al. ................. 370/252 |
| 5,754,959 | A * | 5/1998 | Ueno et al. ................. 455/453 |
| 6,374,112 | B1 * | 4/2002 | Widegren et al. ......... 455/452.2 |
| 6,574,477 | B1 * | 6/2003 | Rathunde .................... 455/453 |
| 7,376,099 | B2 * | 5/2008 | Tseng et al. ................ 370/329 |
| 7,447,506 | B1 * | 11/2008 | MacKenzie et al. ......... 455/453 |
| 7,480,264 | B1 * | 1/2009 | Duo et al. ................ 370/310.2 |
| 7,493,123 | B2 * | 2/2009 | Cave et al. .................. 455/453 |
| 2002/0173315 | A1 * | 11/2002 | Chmaytelli et al. ......... 455/453 |
| 2003/0087645 | A1 * | 5/2003 | Kim et al. .................... 455/453 |
| 2003/0139197 | A1 * | 7/2003 | Kostic et al. ................ 455/525 |
| 2003/0181211 | A1 * | 9/2003 | Razavilar et al. ............ 455/450 |
| 2004/0029592 | A1 * | 2/2004 | Shyy et al. .................. 455/453 |
| 2004/0039817 | A1 * | 2/2004 | Lee et al. .................... 709/225 |
| 2005/0090250 | A1 * | 4/2005 | Backes ....................... 455/434 |
| 2005/0128977 | A1 * | 6/2005 | Kwak et al. ................. 370/329 |
| 2005/0208950 | A1 * | 9/2005 | Hasse ......................... 455/453 |
| 2006/0009232 | A1 * | 1/2006 | Vakil et al. .................. 455/453 |
| 2007/0115906 | A1 * | 5/2007 | Gao et al. .................... 370/338 |
| 2007/0281711 | A1 * | 12/2007 | Matta .......................... 455/453 |
| 2009/0052460 | A1 * | 2/2009 | Coulas et al. ............... 370/401 |
| 2009/0080381 | A1 * | 3/2009 | Yashar et al. ............... 370/331 |

* cited by examiner

FOREIGN PATENT DOCUMENTS

JP 2002-359864 12/2002

*Primary Examiner*—Sharad Rampuria
(74) *Attorney, Agent, or Firm*—Antonelli, Terry, Stout & Kraus, LLP.

(57) ABSTRACT

To reduce load on an access point even if a large number of wireless stations are located very close to the access point. An access point detects a communication load value (S1 and S2) and reports it to wireless stations (S3). The access point waits for a predetermined time after the transmission of the communication load value (5) and detects a communication load value again (S6 and S7). The access point determines whether the first communication load value is larger than a predetermined value K (S4) and whether the second communication load value is larger than K (S8). If the first and second communication load values are larger than K, the access point outputs a warning output command instructing the wireless stations to output a warning prompting their users to move away from their current locations (S9).

15 Claims, 19 Drawing Sheets

US 7,818,014 B2

WIRELESS COMMUNICATION SYSTEM, ACCESS POINT AND WIRELESS STATION COMPOSING THE WIRELESS COMMUNICATION SYSTEM, AND COMMUNICATION LOAD BALANCING METHOD FOR ACCESS POINT

The present application is based on and claims priority of Japanese patent application No. 2005-116900 filed on Apr. 14, 2005, the entire contents of which are hereby incorporated by reference.

BACKGROUND OF THE INVENTION

1. Field of the Invention

The present invention relates to a wireless LAN or other wireless communication system equipped with access points and wireless stations which communicate wirelessly with other stations via the access points, the access points and wireless stations composing the wireless communication system, and a communication load balancing method for the access points.

2. Description of the Related Art

As is well known, in wireless LAN, access points (hereinafter abbreviated to APs) and wireless stations are connected via wireless communications. Multiple APs are connected with each other via wired LAN and connected to a public network such as the Internet via routers or other nodes as required. Generally wireless stations are mobile, and thus it is necessary to switch from the current AP to an adjacent AP as they move. Thus, each wireless station measures the intensity of electromagnetic waves received from APs, and when the electromagnetic waves received from the currently connected AP decrease in intensity along with the movement of the wireless station, it switches to an adjacent AP, making it possible to continue wireless communications.

If a large number of wireless stations happen to concentrate around one AP, resulting in an increase in the number of wireless stations connected to the AP, the AP will be overloaded, causing reductions in wireless transfer speed. This may even disable the wireless communication. To prevent such a situation, there is a technique called load balancing. Known load balancing techniques include the one described in Patent Document 1.

This technique avoids concentration of loads on a single AP by including quantity information about the wireless stations connected to the AP in a beacon transmitted from the AP and making each wireless station determine whether to switch to an adjacent AP based on the quantity information and intensity of the electromagnetic waves received from the current AP. More specifically, the wireless station receives quantity information from each AP, determines whether there is an AP which is connected with less wireless stations by a predetermined number than is the currently connected AP, and switches to any such AP provided that the intensity of electromagnetic waves received from the AP is higher than a predetermined level.

[Patent Document 1]: Japanese Patent Publication No. 2002-359864

However, with the conventional technique, if a large number of wireless stations are located very close to a given AP, the electromagnetic waves received from any other AP is weaker than those received from the given AP and thus the wireless stations do not switch to another AP. Consequently over load status of the AP cannot be corrected.

SUMMARY OF THE INVENTION

The present invention has been made in view of this conventional problem and has an object to provide a wireless communication system which can reduce load on an access point even if a large number of wireless stations are located very close to the AP, access point and wireless station composing the wireless communication system, and communication load balancing method for the access point.

To solve the above problem, the present invention provides an access point which comprises wireless communication means for wireless communications with wireless stations and relays communications between the wireless stations and other stations, comprising:

load detecting means for detecting communication load values of communications with wireless stations;

transmission directing means for making the wireless communication means transmit a first communication load value detected by the load detecting means; and determination means for determining whether the first communication load value is larger than a predetermined value as well as whether a second communication load value detected by the load detecting means a predetermined time after the first communication load value is transmitted by the wireless communication means is larger than a predetermined value, wherein if the determination means determines that the first communication load value and the second communication load value are larger than the respective predetermined values, the transmission directing means makes the wireless communication means transmit a warning output command instructing the wireless stations to output a warning to move from current locations.

To solve the above problem, the present invention provides a wireless communication system comprising;

the access point; and a plurality of the wireless stations each of which comprises wireless communication means for wireless communication with the access point.

To achieve the above object, the present invention provides a wireless station which comprises wireless communication means, communicates wirelessly with an access point using the wireless communication means, and communicates with other stations via the access point, comprising:

analysis means for analyzing data contained in electromagnetic waves received from the access point by the wireless communication means and obtaining communication load values of the access point;

determination means for determining whether a first communication load value obtained by the analysis means is larger than a predetermined value as well as whether a second communication load value obtained a predetermined time after the first communication load value is larger than a predetermined value; and output means for outputting a warning prompting the wireless station to move from the current location, if the determination means determines that the first communication load value and the second communication load value are larger than the respective predetermined values.

To solve the above problem, the present invention provides a wireless communication system comprising;

the wireless station; and the access point which comprises wireless communication means for wireless communication with the wireless station.

To solve the above problem, the present invention provides a communication load balancing method for an access point which relays communications between wireless stations and other stations, comprising:

a first load detecting step of detecting a communication load value (hereinafter referred to as a first communication load value) of communication with wireless stations;

a load value transmitting step of transmitting the first communication load value to the wireless stations;

a second load detecting step of detecting a second communication load value of communications with the wireless stations a predetermined time after the first communication load value is transmitted by the load value transmitting step;

a determination step of determining whether the first communication load value and the second communication load value are larger than the respective predetermined values; and a command transmitting step of transmitting a warning output command instructing the wireless stations to output a warning to move from current locations, if the determination means determines that the first communication load value and the second communication load value are larger than the respective predetermined values.

To solve the above problem, the present invention provides an access point communication load balancing method for a wireless station which communicates with another station via an access point, comprising:

a first load acquisition step of acquiring a communication load value (hereinafter referred to as a first communication load value) of the access point by analyzing data contained in electromagnetic waves received from the access point;

a second load acquisition step of acquiring a second communication load value of the access point a predetermined time after the first communication load value is acquired by the first load acquisition step;

a determination step of determining whether the first communication load value and the second communication load value are larger than respective predetermined values; and an output step of outputting a warning prompting the wireless station to move from the current location, if the determination step determines that the first communication load value and the second communication load value are larger than the respective predetermined values.

According to another aspect, the present invention provides an access point which comprises wireless communication means for wireless communications with wireless stations and relays communications between the wireless stations and other stations, comprising:

load detecting means for detecting communication load values of communications with wireless stations; and transmission directing means for making the wireless communication means transmit a communication load value detected by the load detecting means;

wherein the load detecting means detects an actual communication load value of communications with the wireless stations, compares the actual communication load value with a predetermined reference load value, increases or decreases a communication load value passed in advance to the transmission directing means by a predetermined unit quantity depending on whether the actual communication load value is larger or smaller than the predetermined reference load value, and passes the increased/decreased communication load value to the transmission directing means as a new communication load value.

According to another aspect, the present invention provides a wireless station which comprises wireless communication means, communicates wirelessly with an access point using the wireless communication means, and communicates with other stations via the access point, comprising:

analysis means for analyzing data contained in electromagnetic waves received from the access point by the wireless communication means and obtaining communication load values of the access point;

electromagnetic wave intensity detecting means for detecting intensity of electromagnetic waves received from the access point by the wireless communication means;

switchover assessing means for determining whether to switch to another access point, based on the electromagnetic wave intensity and communication load value of a currently connected access point and the electromagnetic wave intensity and communication load value of the other access point; and switching means for switching to the other access point if the switchover determining means determines to switch to the other wireless station, wherein the switchover assessing means determines whether to switch to the other access point based on magnitude relationship between the communication load value of the currently connected access point and the communication load value of the other access point as well as on whether the electromagnetic wave intensity of the other access point is higher than a predetermined threshold which is determined using the communication load value of the currently connected access point and the communication load value of the other access point as variables.

According to the present invention, if communication load values of an access point at a given time and after a lapse of a predetermined time exceed respective predetermined values, wireless stations are made to output a warning prompting the wireless stations themselves and thus their users to move from their current locations, consequently making it possible to reduce the load on the access point.

BRIEF DESCRIPTION OF THE DRAWINGS

FIG. 10(A) is an explanatory diagram illustrating an area which satisfies a judgment criterion in Step 23b of the flowchart in FIG. 8 while

DETAILED DESCRIPTION OF THE PREFERRED EMBODIMENTS

Figure 1:
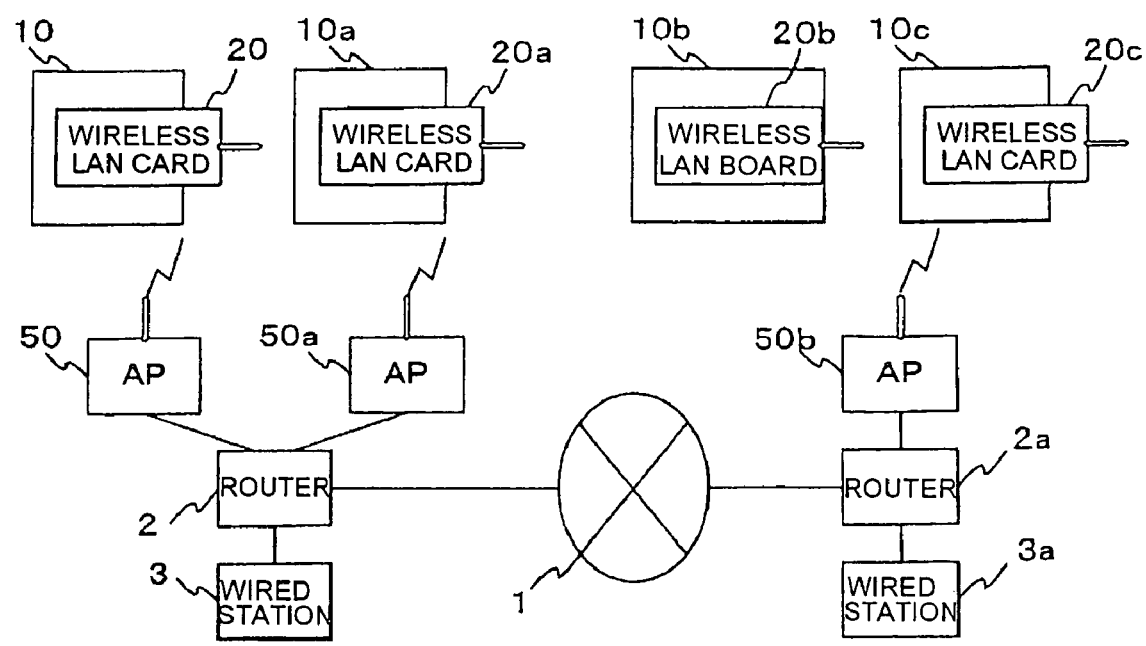
FIG. 1 is a system diagram of a wireless LAN system according to a first embodiment of the present invention.

A wireless LAN system according to the present invention will be described below with reference to the drawings.

First, a wireless LAN system according to a first embodiment will be described with reference to FIGS. 1 to 7.

The LAN system according to this embodiment is equipped with wireless LAN cards 20, 20a, and 20c or a wireless LAN board 20b which are wireless stations; computers 10, 10a, 10b, and 10c into which the wireless stations are inserted; access points (APs) 50, 50a, and 50b for the wireless stations; routers 2 and 2a for wired connection with a public network 1 such as the Internet; and wired stations 3 and 3a hard-wired to the routers 2 and 2a.

Each wireless station can transmit data received from the computer 10 to any one of stations connected to the wireless LAN system, by transmitting the data to an AP 50 with the destination station specified.

Figure 2:
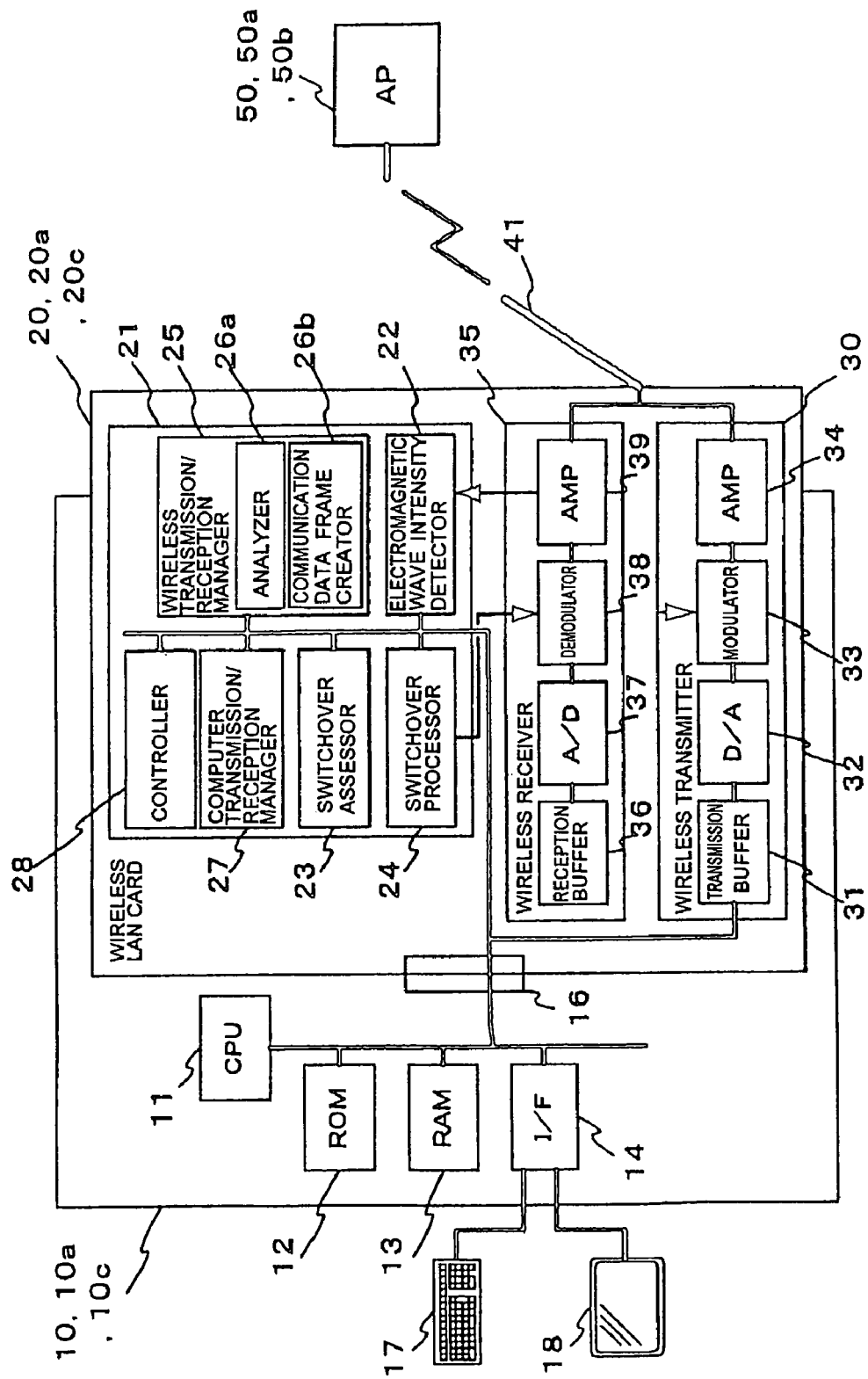
FIG. 2 is a functional block diagram of a wireless station (wireless LAN card) according to the first embodiment of the present invention.

As shown in FIG. 2, the computers 10, 10a, and 10c into which the wireless LAN cards 20, 20a, and 20c are inserted are equipped with memories such as a ROM 12, RAM 13, and the like, a CPU 11 which executes programs stored in the memories, a man-machine interface 14, and a card slot 16 for use to insert the wireless LAN cards 20, 20a, and 20c. The man-machine interface 14 is connected with input devices 17 such as a keyboard and an output device 18 such as a display.

Each wireless LAN card 20, 20a, or 20c is equipped with a communication processor 21, wireless transmitter 30 which transmits data on instructions from the communication processor 21, wireless receiver 35 which receives data transmitted from APs, and antenna 41 for use to transmit signals modulated by the wireless transmitter 30 or receive electromagnetic waves from outside.

In functional terms, the communication processor 21 is equipped with an electromagnetic wave intensity detector 22 which detects intensity of electromagnetic waves received from each AP, switchover assessor 23 which determines whether to switch to another AP based on the intensity of electromagnetic waves received from the APs and the like, switchover processor 24 which switches to the other AP if the switchover assessor 23 determines to do so, wireless transmission/reception manager (transmission directing means) 25 which manages wireless communications with APs, computer transmission/reception manager (output means) 27 which manages wireless communications with the computers 10, 10a, and 10c into which the wireless LAN cards 20, 20a, and 20c are inserted, and controller (transmission directing means) 28 which controls operation of the above functions. Incidentally, the above functions are performed as a CPU of the wireless LAN card executes programs stored in memory of the wireless LAN card.

The wireless transmission/reception manager 25 of the communication processor 21 has an analyzer 26a which analyzes the data received by the wireless receiver 35 and communication data frame creator 26b which creates communication data frames to be sent to the wireless transmitter 30.

The wireless transmitter 30 has a transmission buffer 31 which temporarily stores data to be transmitted, D/A converter 32 which converts digital transmit data received from the transmission buffer 31 into an analog signal, modulator 33 which modulates the analog signal, amplifier 34 which amplifies the modulated signal. On the other hand, the wireless receiver 35 has an amplifier 39 which amplifies a signal received via the antenna 41, demodulator 38 which demodulates the signal from the amplifier, A/D converter 37 which converts the demodulated analog signal into a digital signal, and a reception buffer 36 which temporarily stores the digital signal from the A/D converter 37.

The electromagnetic wave intensity detector 22 of the communication processor 21 detects signal voltage when the electromagnetic waves received from each AP via the antenna 41 are inputted as a signal in the amplifier 39 of the wireless receiver 35 and thereby detects the intensity of the electromagnetic waves received from the AP.

The switchover processor 24 of the communication processor 21 tunes wavelength of a carrier to that of the connection target AP, using the modulator 33 of the wireless transmitter 30 and demodulator 38 of the wireless receiver 35, and thereby switches to that AP.

Incidentally, the wireless LAN board 20b differs from the wireless LAN card 20 in that it cannot be removed easily, but has basically the same functions as the wireless LAN card 20 described above.

Figure 3:
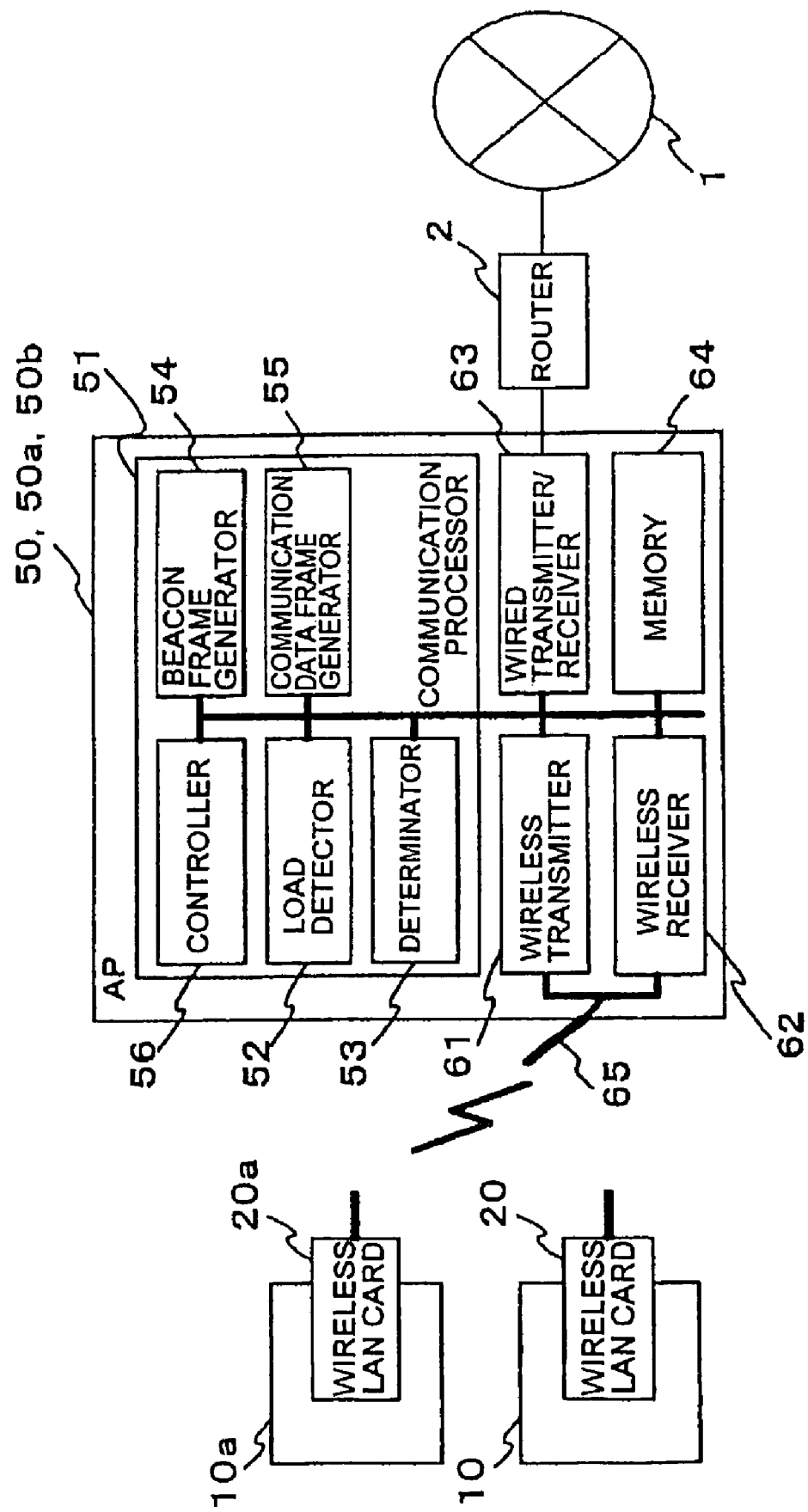
FIG. 3 is a functional block diagram of an access point (AP) according to the first embodiment of the present invention.

As shown in FIG. 3, each access point 50, 50a, or 50b has a communication processor 51; wireless transmitter 61 which transmits data on instructions from the communication processor 51; wireless receiver 62; wired transmitter/receiver 63; memory 64 which stores various programs, data, and the like; and antenna 65 for wireless communications with wireless stations such as the wireless LAN cards 20, 20a, and 20c or wireless LAN board 20b.

In functional terms, the communication processor 51 is equipped with a load detector 52 which detects communication load values of the AP, determinator 53 which determines whether to transmit a warning output command to a connected wireless station in order for the wireless station to output a warning prompting its user to move from the current location, beacon frame generator 54 which generates beacon frames, communication data frame generator 55 which generates communication data frames. Incidentally, the above functions are performed as a CPU of the wireless LAN card executes programs stored in memory of the wireless LAN card.

Figure 4:
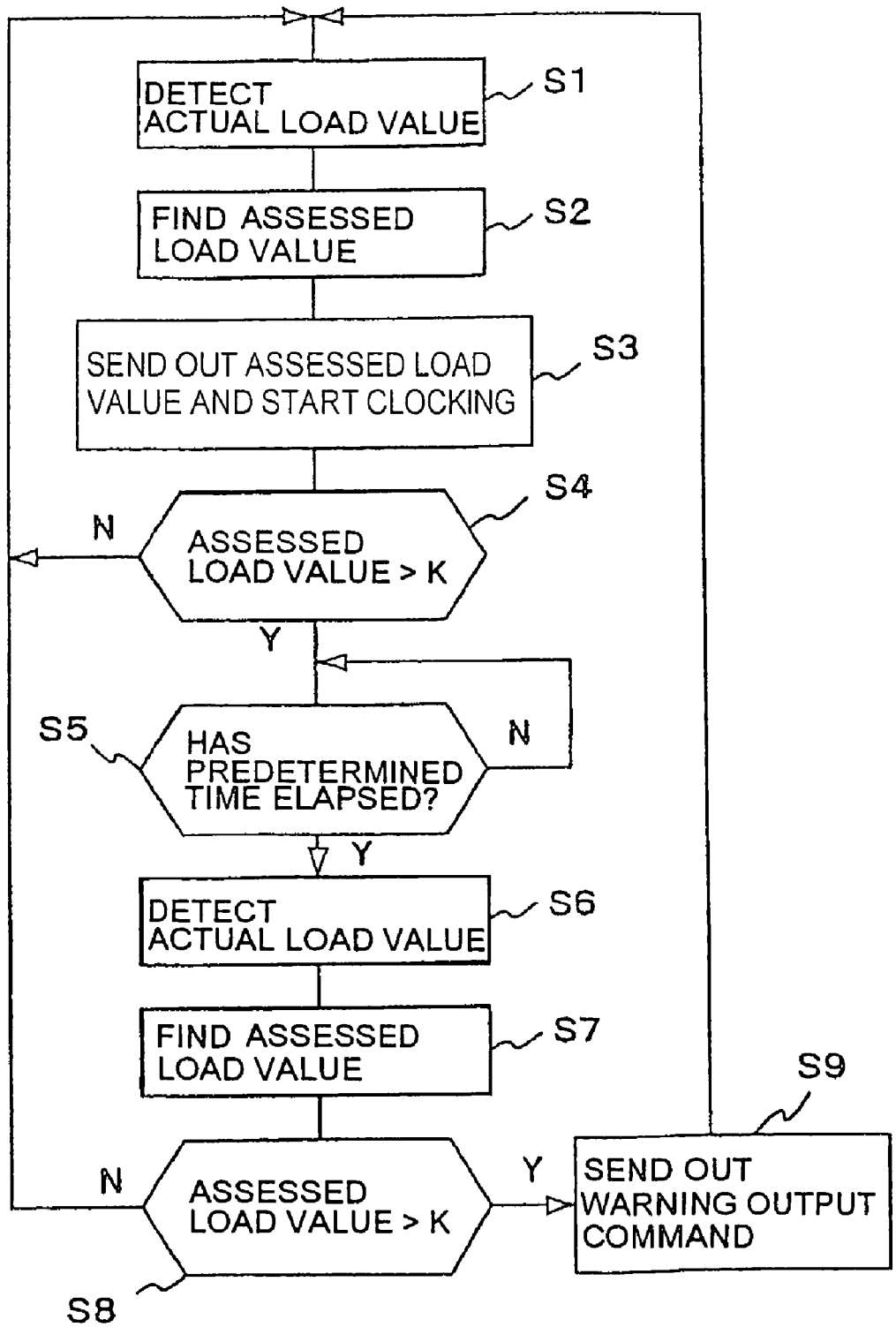
FIG. 4 is a flowchart showing operation of the AP according to the first embodiment of the present invention.

Next, operation of the AP 50 will be described with reference to a flowchart in FIG. 4 by representing the APs 50, 50a, and 50b.

First, the load detector 52 of the AP 50 detects communication load of the AP 50 (S1). Specifically, available parameters of the communication load of the AP 50 include those listed in a), b), c), and d) below. The present invention can use any of them as a communication load parameter.

a) Transmit bits of the AP per unit time, i.e., communication traffic, or ratio of actual transmit bits to maximum transmit bits per unit time;

b) actual number of wireless stations connected to the AP, or ratio of the actual number of wireless stations connected to the AP to a predetermined number of wireless stations;

c) ratio of actual throughput to maximum throughput of the CPU which performs communication processing for the AP; and d) transmission/reception time (time during which transmission or reception is performed) of the AP per unit time, or non-transmission/reception time (time during which no transmission or reception is performed) per unit time.

According to this embodiment, the ratio (%) of actual transmit bits per unit time to maximum transmit bits per unit time is used as the communication load parameter. In this case, procedures for determining the value of the parameter involve prestoring the maximum transmit bit count in memory, detecting output bit count of the transmission buffer of the wireless transmitter 61, and determining the transmit bits per unit time.

Upon detecting the actual communication load (S1), the load detector 52 converts it into an assessed load value (S2). For example, a conversion map is prepared in advance assigning an assessed load value of 3 when the communication load value is 100%, an assessed load value of 2 when the communication load value is 80%, an assessed load value of 1 when the communication load value is 60%, an assessed load value of 0 when the communication load values is 40%, and an assessed load value of −1 when the communication load values is 20%. Then, the assessed load value which corresponds to the actual communication load value is found with reference to the conversion map.

Once the assessed load value is determined (S2), the beacon frame generator 54 generates a beacon frame containing the assessed load value on instructions from a controller 56, and passes the beacon frame to the wireless transmitter 61 in order for the beacon frame to be transmitted, and the controller 56 starts counting time upon completion of the wireless transmission of the beacon frame (S3). The beacon frame issued by the AP 50 is prescribed by IEEE802.11 and contains a duration, a receive address, a transmit address, beacon intervals, parameters defined by information elements, and other information. The "parameters defined by information elements" contained in the beacon frame include a traffic information map (TIM) whose information element number is "5" and a vacant field whose information element number is "32 to 255". The beacon frame generator 54 sets the assessed load value in this vacant field.

Next, the determinator 53 determines whether the assessed load value determined in Step 2 is larger than a predetermined value K (S4). The predetermined value K is such that further increases in the communication load can obstruct wireless communication of the AP 50. For example, "1" is adopted as the predetermined value K. If the assessed load value does not exceed the predetermined value K, the flow returns to Step 1. If the assessed load value is larger than the predetermined value K, the controller 56 determines (S5) whether a predetermined time has elapsed from the start of clocking (S3). The predetermined time, which is counted from the time the load value is transmitted to wireless stations (S3), has a duration long enough for the wireless stations which receive the load value to switch the connection target AP.

If the predetermined time has elapsed from the start of clocking, the load detector 52 detects the actual communication load value again (S6) and converts it into an assessed load value (S7). The determinator 53 determines whether the assessed load value is larger than the predetermined value K (S8). Incidentally, the value K of the threshold used in the determination here is the same as the value used in Step 4, but it may be a different value. If the assessed load value is smaller than K, it is determined that the load on the AP 50 has been reduced due to the transmission of the assessed load value to the wireless stations in Step 3, and the flow returns to Step 1. On the other hand, if the assessed load value is larger than K, it is determined that the load on the AP 50 has not been reduced despite the transmission of the assessed load value to the wireless stations in Step 3, and the controller 56 is notified thereof. Upon receiving the notification, the controller 56 gives instructions to the beacon frame generator 54. The beacon frame generator 54 enters information in the vacant field of a beacon frame whose information element number is "32 to 255", passes the beacon frame to the wireless transmitter 61, and makes the wireless transmitter 61 transmit the beacon frame to connected wireless stations as a beacon signal (S9), where the information entered in the vacant field is a warning output command which instructs the connected wireless stations to output a warning prompting their users to move from their current locations and information that the warning output command is addressed to the connected wireless stations. After the transmission of the warning output command, the flow returns to Step 1 again.

Incidentally, although the warning output command is entered in the beacon frame, the information which indicates that there are data to be transmitted to the connected wireless stations may be entered in the traffic information map (TIM) whose information element number is 5, and a communication data frame containing warning data such as "move away from your current location" may be generated by the communication data frame generator 55 and transmitted to the wireless stations.

After the warning output command is transmitted (S9), the actual load value is detected again (S1 and S6) by returning to Step 1, and if the actual load value has not been reduced, a warning output command is transmitted again in a short time. This is troublesome for the users of the wireless stations. Thus, information as to whether a warning output command has been transmitted in the previous S1 to S9 process may be stored and if a warning output command has been transmitted, the flow may return to Step 1 without transmitting a warning output command again.

Figure 5:
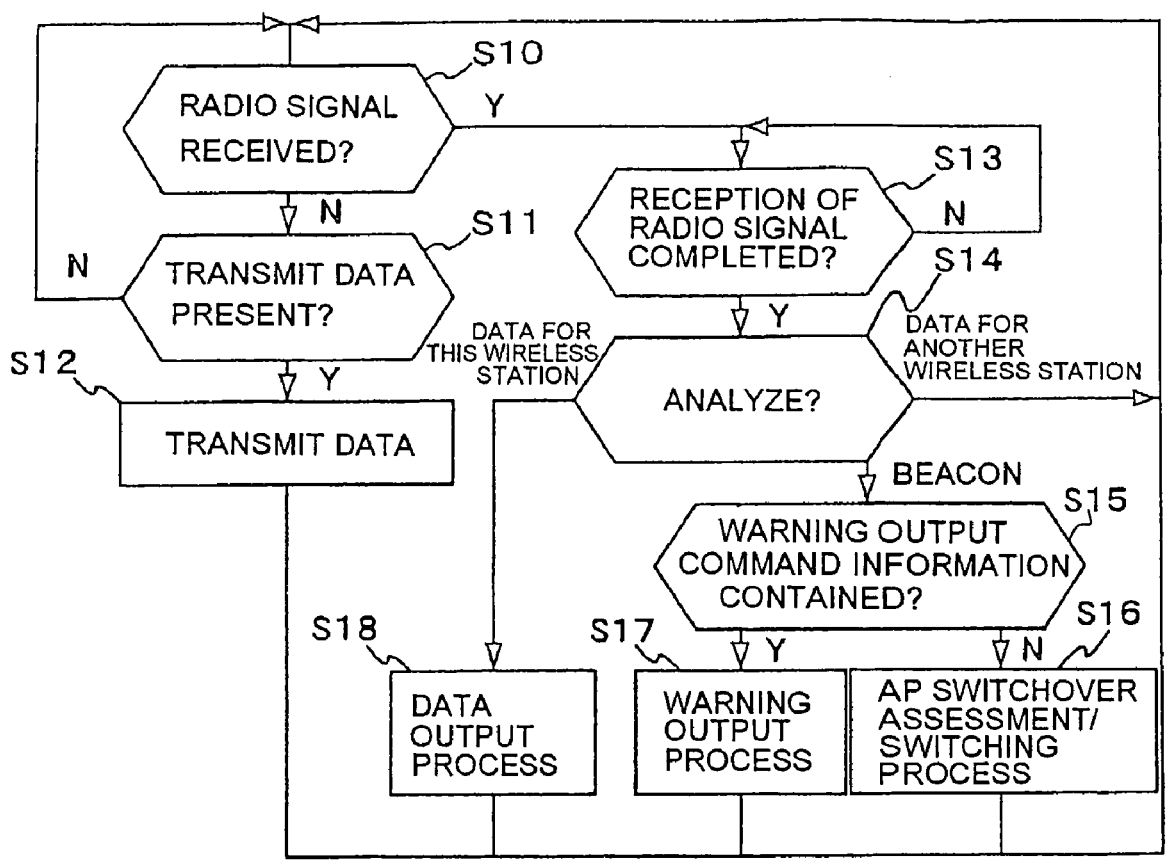
FIG. 5 is a flowchart showing operation of the wireless station according to the first embodiment of the present invention.

Next, operation of the wireless station 20 will be described with reference to a flowchart in FIGS. 5 and 6 by representing the wireless stations 20, 20a, and 20c.

First, the controller 28 of the wireless station 20 determines whether the wireless receiver 35 has received a radio signal (S10). If no radio signal has been received, the controller 28 determines whether there are transmit data for any wireless station (S11). If there are no transmit data, the flow returns to Step 10. If there are transmit data, the controller 28 makes the wireless transmitter 30 transmit the transmit data (S12) and the flow returns to Step 10.

If it is determined in Step 10 that the wireless receiver 35 has received a radio signal, an analyzer 26a of the wireless transmission/reception manager 25 determines whether reception of the radio signal is complete (S13). The analyzer 26a makes the determination based on a received data volume, which can be found by analyzing a header or the like of a radio signal frame. If the reception of the radio signal is not complete, the analyzer 26a waits until the reception is completed. Upon completion of the reception, the analyzer 26a determines whether data from the radio signal are communication data addressed to the wireless station itself, communication data addressed to another wireless station, or a beacon (S14).

If the data from the radio signal are communication data addressed to the wireless station itself, the data are passed to the computer transmission/reception manager 27, which sends the data to the computer 10 via the card slot 16 of the computer 10. Upon receiving the data, the computer 10 makes the output device 18 output the data (S18). If the data from the radio signal are communication data addressed to another wireless station, the flow returns to Step 10.

If the data from the radio signal are a beacon, the analyzer 26a determines whether the data contains a warning output command (S15). If no warning output command is contained in the data, the computer transmission/reception manager 27 is notified accordingly. Upon receiving the notification, the computer transmission/reception manager 27 sends predetermined display data such as "move away from your current location" to the computer 10 via the card slot 16 of the computer 10. Upon receiving the data, the computer 10 forces the output device 18 to output the data (S17). Incidentally, the warning output may be provided not only in the form of visual display, but also in the form of voice or vibration.

Thus, according to this embodiment, if the communication load value of the AP continues to exceed the threshold K even after a lapse of a predetermined time, a warning output command is included in a beacon, thereby prompting the wireless station itself and thus its user to move from the current location and consequently reducing the communication load on the AP.

If it is determined in Step 10 that no warning output command is contained in the beacon, the flow returns to Step 10 after an AP switchover assessment/switching process (S16) is performed.

Next, details of the switchover assessment/switching process (S16) performed by the wireless station 20 will be described with reference to a flowchart in FIG. 6.

First, the switchover assessor 23 accepts the assessed load values of APs from the analyzer 26a (S20). Then, the electromagnetic wave intensity detector 22 of the communication processor 21 detects signal voltage when the electromagnetic waves received from each AP via the antenna 41 are inputted as a signal in the amplifier 39 of the wireless receiver 35 and thereby measures the intensity of the electromagnetic waves received from the AP (S21) Incidentally, output timings of the beacons from the APs are offset from each other to avoid contention of the beacons from the APs, and thus the wireless station 20 receives beacons from different APs at different times. Consequently, the reception of a single radio signal (S10) according to the flowchart in FIG. 5 provides the assessed load value contained in the beacon from only one AP. Therefore, actually, each time the switchover assessor 23 receives an assessed load value from the analyzer 26a, it stores the assessed load value temporarily so as to store at least one assessed load value of each non-connected AP, and Step 22 and subsequent steps are carried out after the assessed load value of the connected AP is stored. Besides, after receiving an assessed load value from the analyzer 26a, the switchover assessor 23 cannot detect the received electromagnetic wave intensity of the beacon which contains the assessed load value. Thus, actually, each time a radio signal is received in Step 10 of the flowchart in FIG. 5, the switchover assessor 23 detects the electromagnetic wave intensity of the radio signal, and if the radio signal is a beacon signal, it stores the electromagnetic wave intensity of the beacon by associating it with an identifier which indicates the AP to which the beacon belongs. Then, it reads out the received electromagnetic wave intensity of the beacon from each AP before Step 22 described later.

That is, although it appears from FIG. 6 that Step 20 and Step 21 are carried out in this order, actually, as described above, it is not that Step 20 and Step 21 are carried out in sequence, and it means only that Step 20 and Step 21 are carried out before Step 22 described later.

Also, although it has been described that the wireless station 20 receives beacons from APs one after another and thereby obtains the assessed load values of the APs, the assessed load values of multiple APs can also be acquired by receiving and analyzing a beacon from a single AP if the multiple APs exchange assessed load value information among themselves via the router 2, allowing each AP to learn the assessed load values of the other APs.

Once the assessed load value of each AP and electromagnetic wave intensity from each AP are received (S20 and S21), the switchover assessor 23 extracts the electromagnetic wave intensity $P_0$ and assessed load value $L_0$ of the connected AP as well as the highest electromagnetic wave intensity $P_1$ and assessed load value $L_1$ of the non-connected AP which gives the highest electromagnetic wave intensity (S22).

Then, the switchover assessor 23 determines whether the difference ($P_0-L_0$) between the electromagnetic wave intensity $P_0$ and assessed load value $L_0$ of the connected AP is larger than the difference ($P_1-L_1$) between the electromagnetic wave intensity $P_1$ and assessed load value $L_1$ of the non-connected AP (S23). That is, assuming that the larger the assessed load value, the lower the electromagnetic wave intensity, it is determined whether an equivalent electromagnetic wave intensity of the connected AP is larger than an equivalent electromagnetic wave intensity of the non-connected AP.

If the equivalent electromagnetic wave intensity of the non-connected AP is larger, the switchover assessor 23 determines that it is preferable to switch to the non-connected AP and instructs the switchover processor 24 to switch to the non-connected AP (S24). For that, the switchover processor 24 tunes the wavelength of the carrier to that of the non-connected AP using the modulator 33 of the wireless transmitter 30 and demodulator 38 of the wireless receiver 35.

On the other hand, if the equivalent electromagnetic wave intensity of the non-connected AP is not larger, the switchover assessor 23 determines whether there are data about another non-connected AP (S25). If there is no data about another non-connected AP, the switchover assessor 23 terminates its processing, but if there are data about another non-connected AP, the switchover assessor 23 returns to Step 22. In Step 22, the electromagnetic wave intensity and assessed load value of the non-connected AP with the highest electromagnetic wave intensity is selected from the non-connected APs excluding the non-connected AP selected previously.

As described above, in this embodiment, the AP to connect the wireless station to is switched according to the electromagnetic wave intensity and assessed load values of APs.

Now, with reference to FIG. 7, description will be given of how switching occurs among APs placed at various locations with respect to the wireless station. In the figure, it is assumed that the AP 50 is located at the origin (0, 0) of an X-Y coordinate system, that the AP 50a is located at point a (1, 0), and that the APs 50 and 50a emit electromagnetic waves of the same power. Also, assuming that the intensity of the electromagnetic wave received by the wireless station is inversely proportional to the square of the distance, a line on which the equivalent electromagnetic wave intensities become equal when the APs 50 and 50a have equal communication load values ($L_0=0$, $L_1=0$) is denoted by A, a line on which the equivalent electromagnetic wave intensities become equal when the electromagnetic wave intensity of the AP 50 is larger by 1 than the equivalent electromagnetic wave intensity of the AP 50a ($L_0=+1$, $L_1=0$) is denoted by B, and a line on which the equivalent electromagnetic wave intensities become equal when the electromagnetic wave intensity of the AP 50 is larger by 2 than the equivalent electromagnetic wave intensity of the AP 50a ($L_0=+2$, $L_1=0$) is denoted by C.

Line A, on which the equivalent electromagnetic wave intensities become equal when the APs 50 and 50a have equal communication load values, is naturally a straight line of $X=0.5$. When $Y \geqq 0$, lines B and C are curves whose Y value decreases progressively with increases in the value of X, i.e., they are upward-sloping curves. When $Y<0$, lines B and C are curves whose Y value increases progressively with increases in the value of X, i.e., they are downward-sloping curves. The intersection between line B and X axis is smaller than $X=0.5$. For example, it is $X=0.47$. The intersection between line C and X axis is smaller than the X coordinate of the intersection between line B and X axis. For example, it is $X=0.44$.

Figure 7:
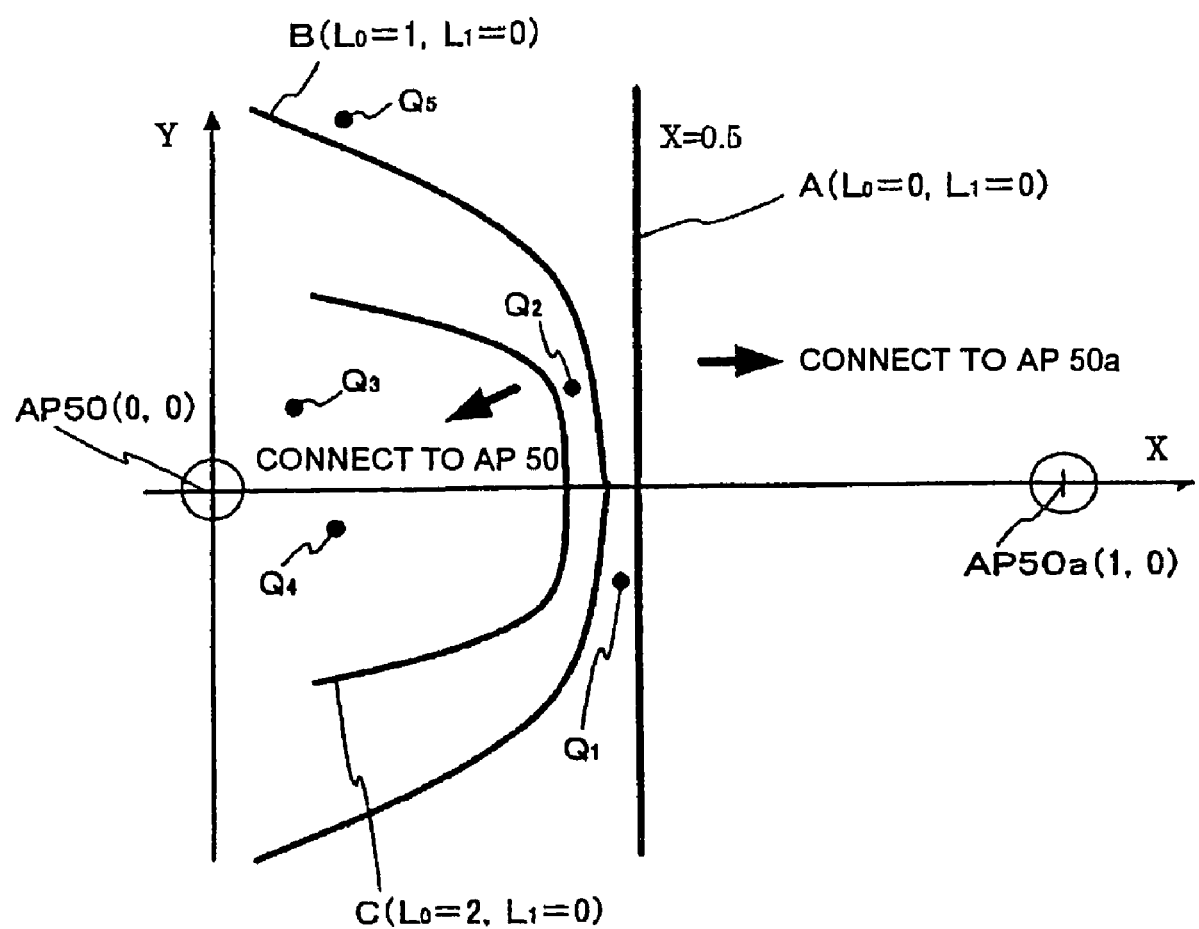
FIG. 7 is an explanatory diagram illustrating how a connection target is switched when wireless stations are located at various places around an AP according to the first embodiment of the present invention.

Suppose that when a wireless station connected to the AP 50 is located at point $Q_1$ in FIG. 7, the situation changes from one in which the communication load values of the APs 50 and 50a are equal ($L_0=0$, $L_1=0$) to one in which the communication load value of the AP 50 is larger by 1 than the communication load value of the AP 50a ($L_0=+1$, $L_1=0$). Since point $Q_1$ at which the wireless station is located is nearer to the AP 50a than line B on which the equivalent electromagnetic wave intensities become equal when the electromagnetic wave intensity of the AP 50 is larger by 1 than the equivalent electromagnetic wave intensity of the AP 50a ($L_0=+1$, $L_1=0$), the wireless station switches to the AP whose electromagnetic wave intensity is higher, i.e., the AP 50a which has the lower communication load.

Also, suppose that when the wireless station connected to the AP 50 is located at point $Q_2$, the situation changes from one in which the communication load values of the APs 50 and 50a are equal ($L_0=0$, $L_1=0$) to one in which the communication load value of the AP 50 is larger by 2 than the communication load value of the AP 50a ($L_0=+2$, $L_1=0$). Since point $Q_2$ at which the wireless station is located is nearer to the AP 50a than line C on which the equivalent electromagnetic wave intensities become equal when the electromagnetic wave intensity of the AP 50 is larger by 2 than the equivalent electromagnetic wave intensity of the AP 50a, the wireless station switches to the AP whose electromagnetic wave intensity is higher, i.e., the AP 50a which has the lower communication load.

However, when the communication load value of the AP 50 is larger by 2 than the communication load value of the AP 50a ($L_0=+2$, $L_1=0$), if the wireless station is located at point $Q_3$ or $Q_4$ which is closer to the AP 50 than to line C on which the equivalent electromagnetic wave intensities become equal, since the electromagnetic waves from the AP 50a are very weak, the equivalent electromagnetic wave intensity of the AP 50 is higher at the points $Q_3$ and $Q_4$, and the wireless station does not switch to the AP 50a even if the communication load of the AP 50 is high.

Thus, according to this embodiment, if the communication load value of the AP at a given time is higher than a predetermined value and remains to be higher than the predetermined value when a predetermined time elapses after the communication load value is transmitted, i.e., if the wireless station does not switch to another AP even after it is informed of the high load, a warning such as "move away from your current location" is outputted from the wireless station prompting its user to move from the current location in order to reduce the load on the AP.

Incidentally, although in this embodiment, AP switchover is assessed based on an assessed load value, the present invention is not limited to this, and an actual load value may be used instead of the assessed load value. Also, although the value obtained by subtracting the assessed load value from the electromagnetic wave intensity is used as an equivalent electromagnetic wave intensity assuming that the larger the assessed load value, the lower the electromagnetic wave intensity, the value obtained by dividing the electromagnetic wave intensity by the assessed load value or actual load value may be used as an equivalent electromagnetic wave intensity. In that case, line A' on which the equivalent electromagnetic wave intensities become equal when the APs 50 and 50a have equal communication load values ($L_0=0$, $L_1=0$), line B' on which the equivalent electromagnetic wave intensities become equal when the electromagnetic wave intensity of the AP 50 is larger by 1 than the equivalent electromagnetic wave intensity of the AP 50a ($L_0=+1$, $L_1=0$), and line C' on which the equivalent electromagnetic wave intensities become equal when the electromagnetic wave intensity of the AP 50 is larger by 2 than the equivalent electromagnetic wave intensity of the AP 50a ($L_0=+2$, $L_1=0$) have basically the same shapes as lines A, B, and C in FIG. 7, respectively.

Incidentally, in this embodiment, when a wireless station connected to the AP 50 is located at point $Q_5$ in FIG. 7, if the situation changes to one in which the communication load value of the AP 50 is larger by 1 than the communication load value of the AP 50a ($L_0=+1$, $L_1=0$), since point $Q_5$ at which the wireless station is located is nearer to the AP 50a than to line B, the wireless station switches to the AP whose electromagnetic wave intensity is higher. Actually, however, at point $Q_5$, the electromagnetic waves from the AP 50 is relatively strong and the electromagnetic waves from the AP 50a is very weak. Thus, in this embodiment, a communication failure can occur when the wireless station switches to the AP 50a. That is, according to this embodiment, when the wireless station is located at point $Q_5$ or other location wide apart from a straight line joining the connected AP and a non-connected AP which is a candidate for connection, switching the connection target AP can cause a communication failure.

Figure 8:
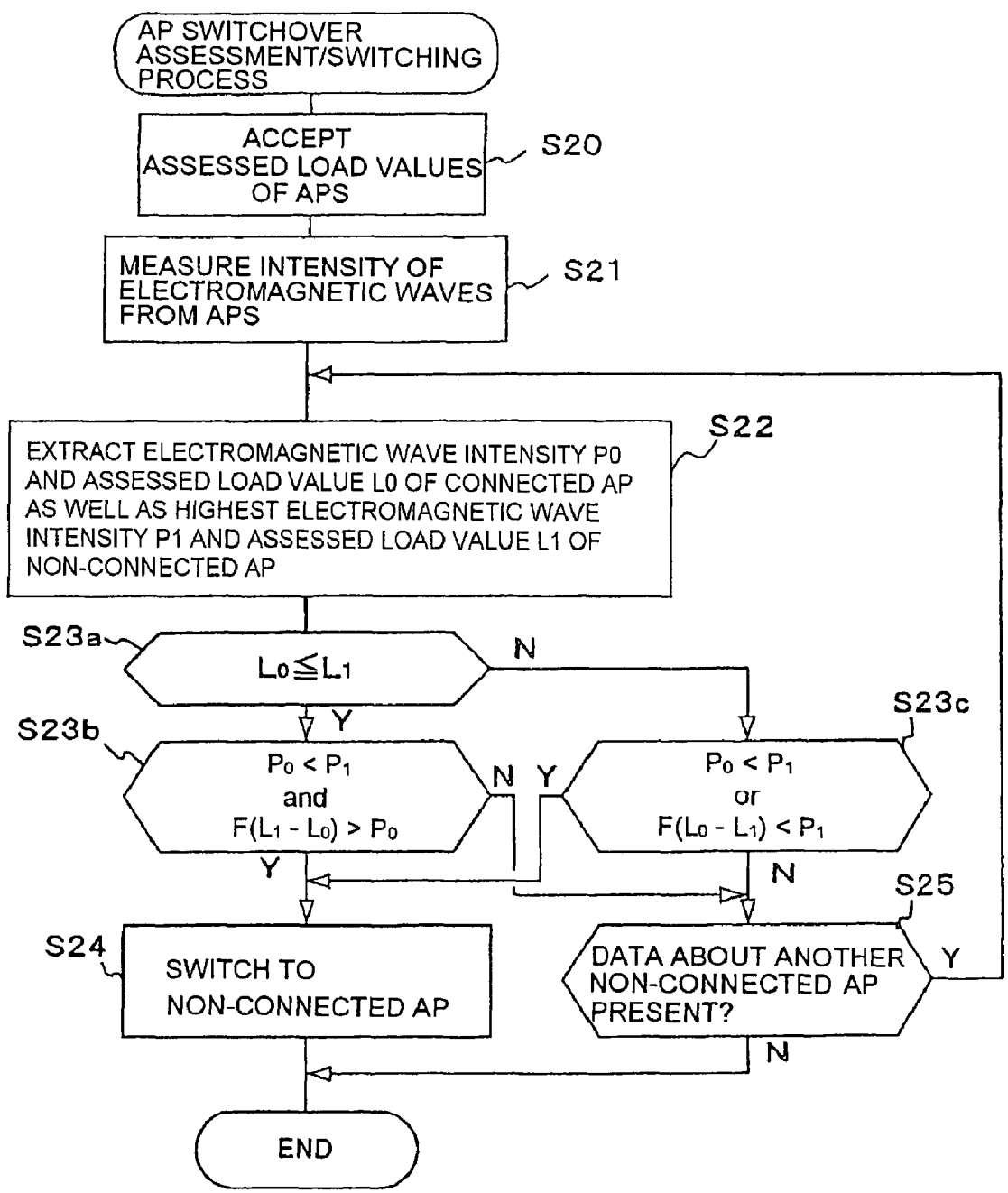
FIG. 8 is a flowchart showing details of a first variation of the AP switchover assessment/switching process according to the first embodiment of the present invention.

Next, a first variation of the switchover assessment/switching process (S16) performed by the wireless station 20 will be described with reference to a flowchart in FIG. 8.

First, as in the case of the embodiment described above (FIG. 6), the switchover assessor 23 accepts the assessed load values of APs from the analyzer 26a (S20). Then, the electromagnetic wave intensity detector 22 detects signal voltage when the electromagnetic waves received from each AP via the antenna 41 are inputted as a signal in the amplifier 39 of the wireless receiver 35 and thereby measures the received intensity of the electromagnetic waves (S21). Then, the switchover assessor 23 extracts the electromagnetic wave intensity $P_0$ and assessed load value $L_0$ of the connected AP as well as the highest electromagnetic wave intensity $P_1$ and assessed load value $L_1$ of the non-connected AP which gives the highest electromagnetic wave intensity (S22).

Next, the switchover assessor 23 determines whether the assessed load value $L_1$ of the non-connected AP is equal to or larger than the assessed load value $L_0$ of the connected AP (S23a). If the assessed load value $L_1$ of the non-connected AP is equal to or larger than the assessed load value $L_0$ of the connected AP, i.e., if the assessed load value of the connected AP is smaller, the switchover assessor 23 determines whether $P_0<P_1$ and $F(L_1-L_0)>P_0$ (S23b). If $P_0<P_1$ and $F(L_1-L_0)>P_0$, the switchover assessor 23 instructs the switchover processor 24 to switch the connection target to the non-connected AP (S24). If the condition $P_0<P_1$ and $F(L_1-L_0)>P_0$ is not satisfied, the flow goes to Step 25. Incidentally, a function F used in judgment criteria in Step 23b as well as details of the judgment criteria will be described later.

If it is determined in Step 23a that the assessed load value $L_1$ of the non-connected AP is smaller than the assessed load value $L_0$ of the connected AP, i.e., if is it determined that the assessed load value of the connected AP is larger, the switchover assessor 23 determines whether $P_0<P_1$ or $F(L_0-L_1)<P_1$ (S23c). If the condition $P_0<P_1$ or $F(L_0-L_1)<P_1$ is satisfied, the switchover assessor 23 instructs the switchover processor 24 to switch to the L non-connected AP (S24). If the condition $P_0<P_1$ or $F(L_0-L_1)<P_1$ is not satisfied, the flow goes to Step 25.

Figure 6:
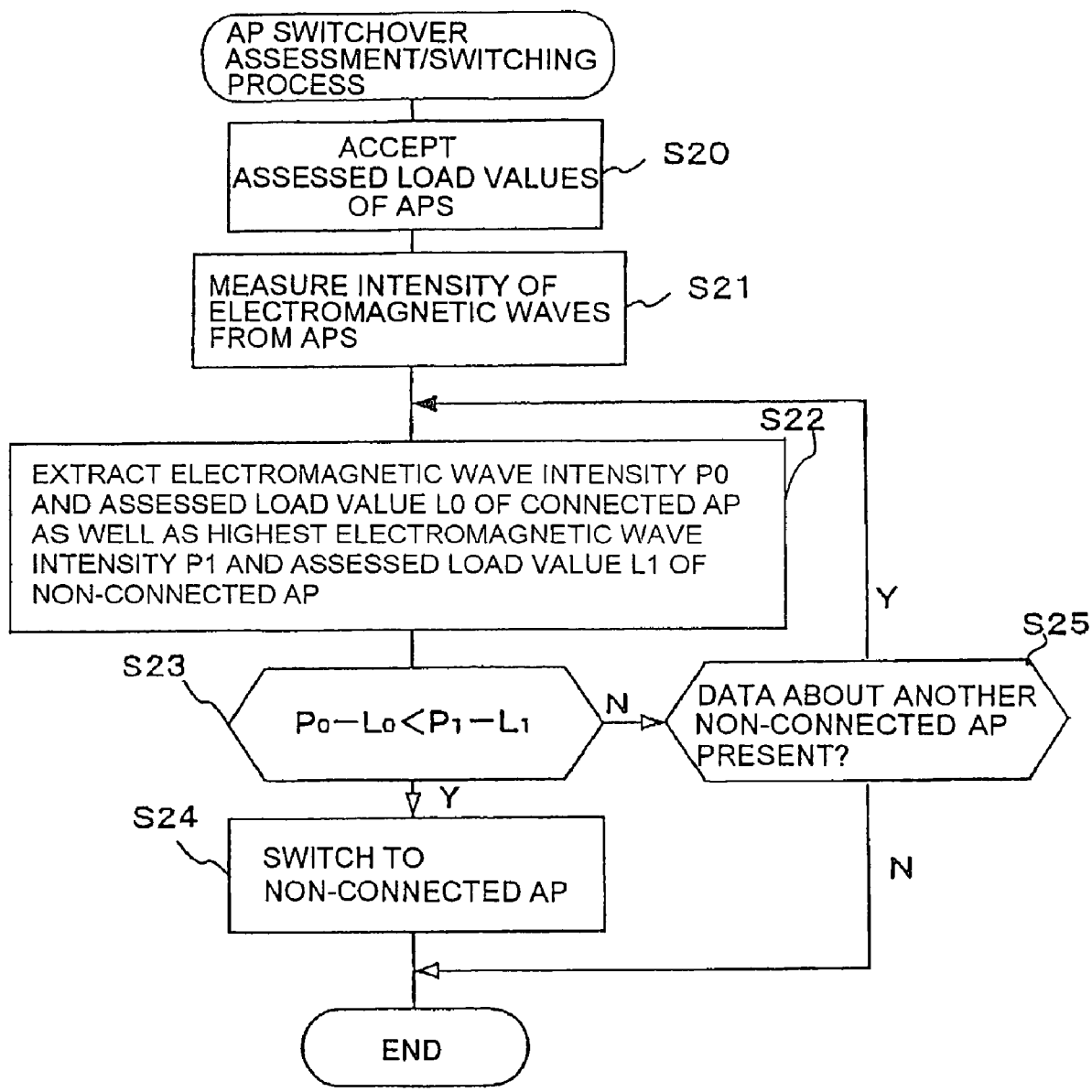
FIG. 6 is a flowchart showing details of an AP switchover assessment/switching process according to the first embodiment of the present invention.

In Step 25, as with Step 25 in the flowchart of FIG. 6, the switchover assessor 23 determines whether there are data about another non-connected AP. If there is no data about another non-connected AP, the switchover assessor 23 terminates its processing, but if there are data about another non-connected AP, the switchover assessor 23 returns to Step 22.

Figure 9:
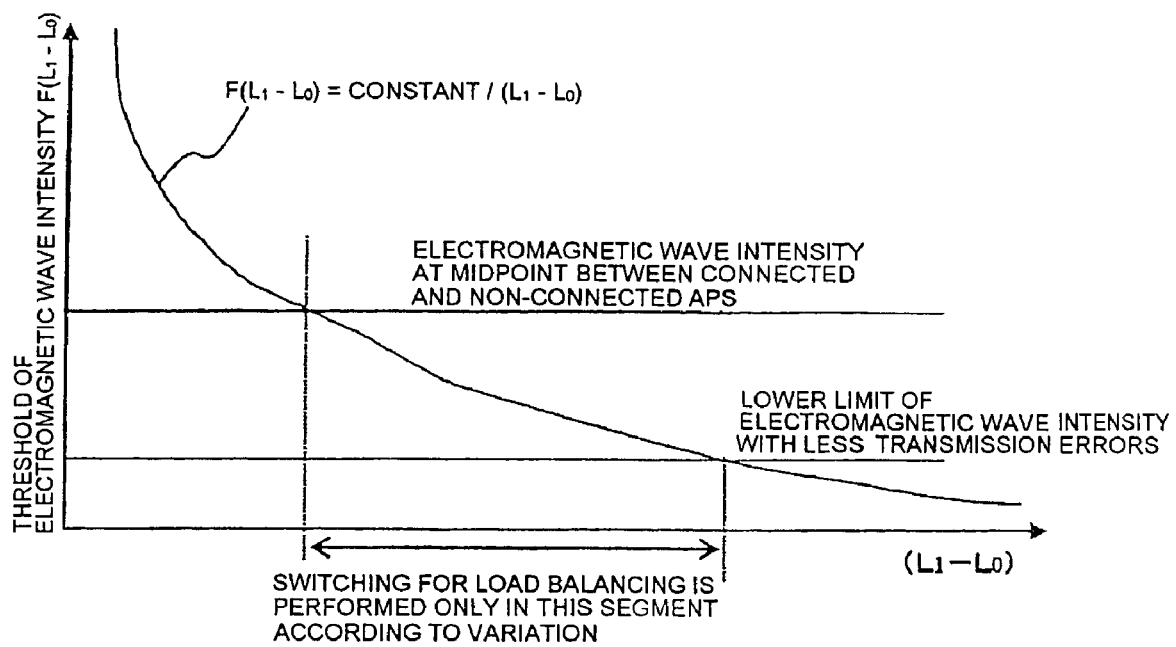
FIG. 9 is an explanatory diagram illustrating the nature of a function F which represents a threshold of electromagnetic wave intensity according to the first embodiment of the present invention.

Now, the function F used in Step 23b will be described with reference to FIG. 9.

If the function F which represents a threshold is the ordinate and a variable of the function F is the abscissa, the function $F(L_1-L_0)$ decreases with increases in $(L_1-L_0)$. Specifically, for example, the function F is given by $F(L_1-L_0)$ =constant/$(L_1-L_0)$. Also, the threshold F, which is used to compare electromagnetic wave intensity with, is expressed in watt or the like.

Similarly, the function $F(L_0-L_1)$ used in Step 23c decreases with increases in $(L_0-L_1)$. Specifically, for example, the function F is given by $F(L_0-L_1)$=constant/$(L_0-L_1)$.

Next, the judgment criteria in Step 23b and judgment criteria in Step 23c will be described with reference to FIG. 10. As in the case of FIG. 7 described above, it is assumed here that the AP 50 is located at the origin (0, 0) of an X-Y coordinate system and that the AP 50a is located at point a (1, 0).

Figure 10A:
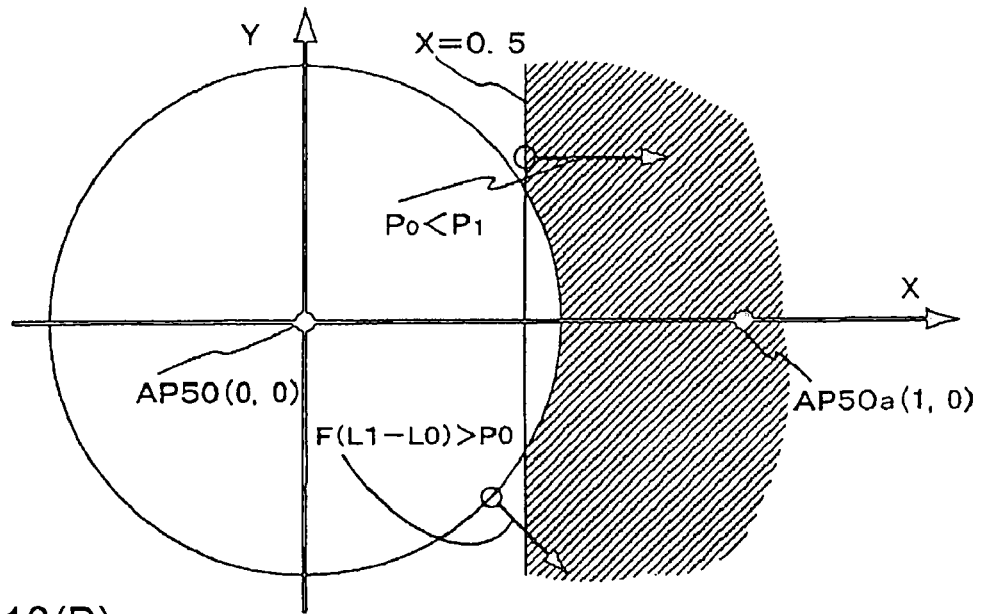

To satisfy $P_0<P_1$, one of the judgment criteria in Step 23b, the wireless station must be located on that side of line X=0.5 which is nearer to the AP 50a as shown in FIG. 10(A). To satisfy $F(L_1-L_0)>P_0$, the other one of the judgment criteria in Step 23b, the electromagnetic wave intensity $P_0$ of the AP 50 must be lower than the threshold $F(L_1-L_0)$. In FIG. 10, the threshold $F(L_1-L_0)$ of the electromagnetic wave intensity $P_0$ of the AP 50 is defined by a circle of radius $F(L_1-L_0)$ with a center at the location (0, 0) of the AP 50. Thus, to satisfy $F(L_1-L_0)>P_0$, the wireless station must be farther away from the location (0, 0) of the AP 50 than is the circle. In short, to satisfy both judgment criteria, the wireless station must be located in the hatched area in FIG. 10.

Thus, if is it determined in Step 23a that the assessed load value $L_0$ of the connected AP is smaller when the wireless station is located in the hatched area in FIG. 10 which satisfies both judgment criteria, the connection target is switched to the non-connected AP even if the assessed load value $L_0$ of the connected AP is smaller.

Figure 10B:
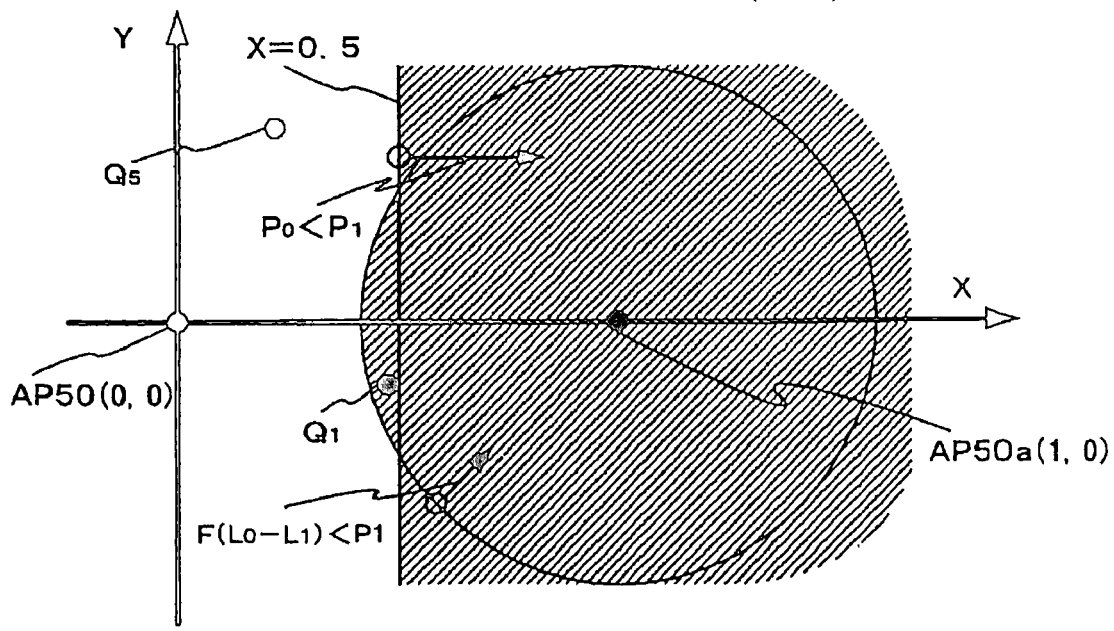
FIG. 10(B) is an explanatory diagram illustrating an area which satisfies a judgment criterion in Step 23c of the flowchart in FIG. 8.

Also, to satisfy $P_0<P_1$, one of the judgment criteria in Step 23c, the wireless station must be located on that side of line X=0.5 which is nearer to the AP 50a as shown in FIG. 10(B).

To satisfy $F(L_0-L_1)<P_1$, the other one of the judgment criteria in Step 23c, the electromagnetic wave intensity P1 of the AP 50a must be higher than the threshold $F(L_0-L_1)$. In FIG. 10, the threshold $F(L_0-L_1)$ of the electromagnetic wave intensity $P_1$ of the AP 50a is defined by a circle of radius $F(L_0-L_1)$ with a center at the location (1, 0) of the AP 50a. Thus, to satisfy $F(L_0-L_1)<P_1$, the wireless station must be nearer to the location (1, 0) of the AP 50 than is the circle. In short, to satisfy one of the judgment criteria, the wireless station must be located in the hatched area in FIG. 10.

Thus, if is it determined in Step 23a that the assessed load value $L_0$ of the connected AP is larger when the wireless station is located in the hatched area in FIG. 10 which satisfies one of the judgment criteria, the connection target is switched to the non-connected AP 50a.

Thus, in this variation, the wireless station switches its connection target when the wireless station is located at point $Q_1$ relatively lose to a straight line joining the connected AP and a non-connected AP 50a, but it does not switch its connection target when it is located at point $Q_5$ wide apart from the straight line. This makes it possible to correct the problem encountered in the above embodiment.

Figure 11:
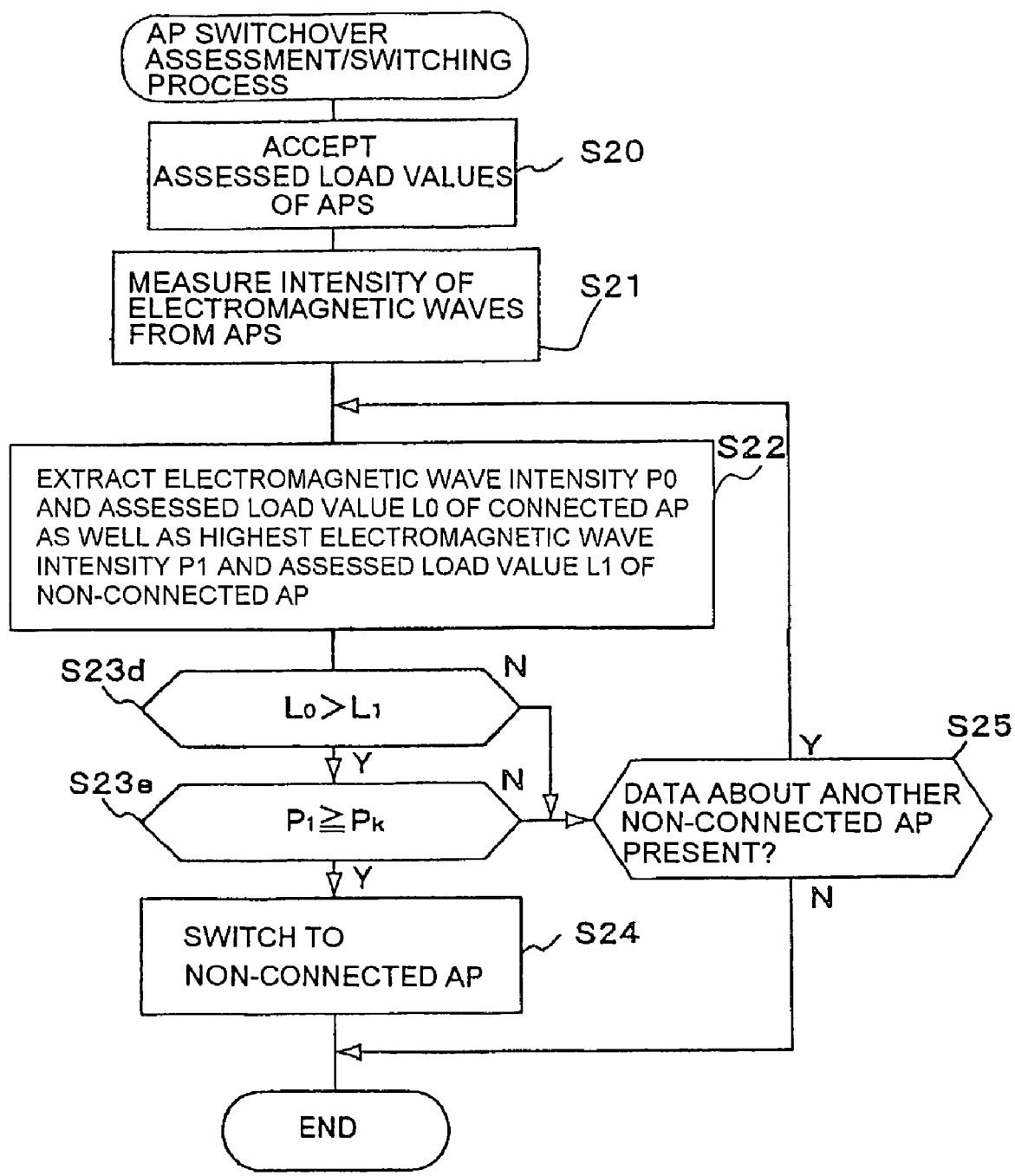
FIG. 11 is a flowchart showing details of a second variation of the AP switchover assessment/switching process according to the first embodiment of the present invention.
Figure 12:
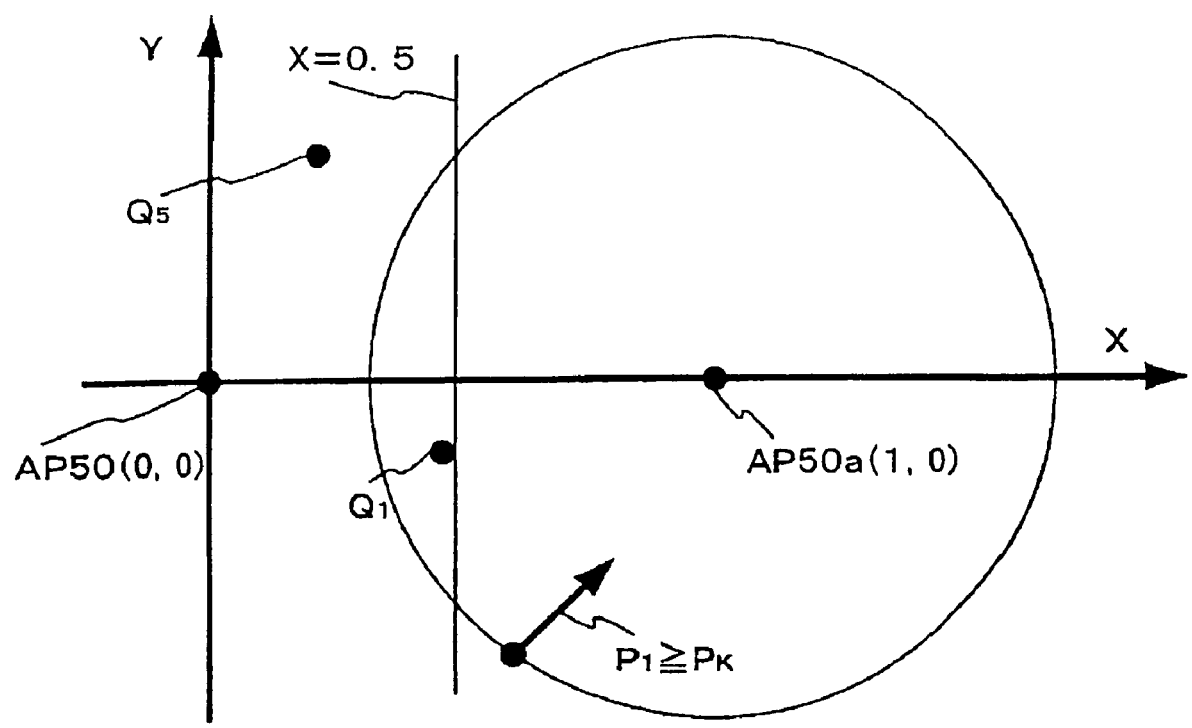
FIG. 12 is an explanatory diagram illustrating an area which satisfies a judgment criterion in Step 23e of the flowchart in FIG. 11.

Next, a second variation of the switchover assessment/switching process (S16) performed by the wireless station 20 will be described with reference to a flowchart in FIG. 11. Incidentally, this variation is a simplified version of the first variation. Specifically, when the communication load value of the connected AP 50 is reduced, the connection target is not switched to a non-connected AP 50a. Also, unlike the first variation, the threshold of electromagnetic wave intensity used as a judgment criterion for switching the connection target is fixed instead of being varied according to the difference between the load values of two adjacent APs.

First, as in the case of the embodiment (FIG. 6) and first variation (FIG. 8) described above, the switchover assessor 23 accepts the assessed load values of APs from the analyzer 26a (S20). Then, the electromagnetic wave intensity detector 22 detects signal voltage when the electromagnetic waves received from each AP via the antenna 41 are inputted as a signal in the amplifier 39 of the wireless receiver 35 and thereby measures the received intensity of the electromagnetic waves (S21). Then, the switchover assessor 23 extracts the electromagnetic wave intensity $P_0$ and assessed load value $L_0$ of the connected AP as well as the highest electromagnetic wave intensity $P_1$ and assessed load value $L_1$ of the non-connected AP which gives the highest electromagnetic wave intensity (S22).

Next, the switchover assessor 23 determines whether the assessed load value $L_0$ of the connected AP 50 is larger than the assessed load value $L_1$ of the non-connected AP 50a (S23d) If the assessed load value $L_0$ of the connected AP 50 is larger than the assessed load value $L_1$ of the non-connected AP 50a, the switchover assessor 23 determines whether the electromagnetic wave intensity $P_1$ of the AP 50a which is a candidate for connection is equal to or higher than a predetermined fixed value $P_K$ (S23e). If the electromagnetic wave intensity $P_1$ of the AP 50a which is a candidate for connection is equal to or higher than the fixed value $P_K$, the switchover assessor 23 instructs the switchover processor 24 to switch to the non-connected AP 50a (S24). If the electromagnetic wave intensity $P_1$ of the AP 50a which is a candidate for connection is lower than the fixed value $P_K$ and if it is determined in Step 23d that the assessed load value $L_0$ of the connected AP 50 is smaller than the assessed load value $L_1$ of the non-connected AP 50a, the switchover assessor 23 goes to Step 25, where it determines whether there are data about another non-connected AP. If there is no data about another non-connected AP, the switchover assessor 23 terminates its processing, but if there are data about another non-connected AP, the switchover assessor 23 returns to Step 22.

According to the second variation, when the assessed load value $L_0$ of the connected AP 50 is larger than the assessed load value $L_1$ of the non-connected AP 50a which is a candidate for connection, the connection target is switched to the non-connected AP 50a only if the electromagnetic wave intensity $P_1$ of the AP 50a which is a candidate for connection is equal to or higher than the fixed value $P_K$ ($P_1 \geq P_K$). Consequently, the connection target of the wireless station is not switched when the wireless station is located at point $Q_5$ wide apart from the straight line joining the connected AP and non-connected AP. This makes it possible to correct the problem encountered in the above embodiment.

Figure 13:
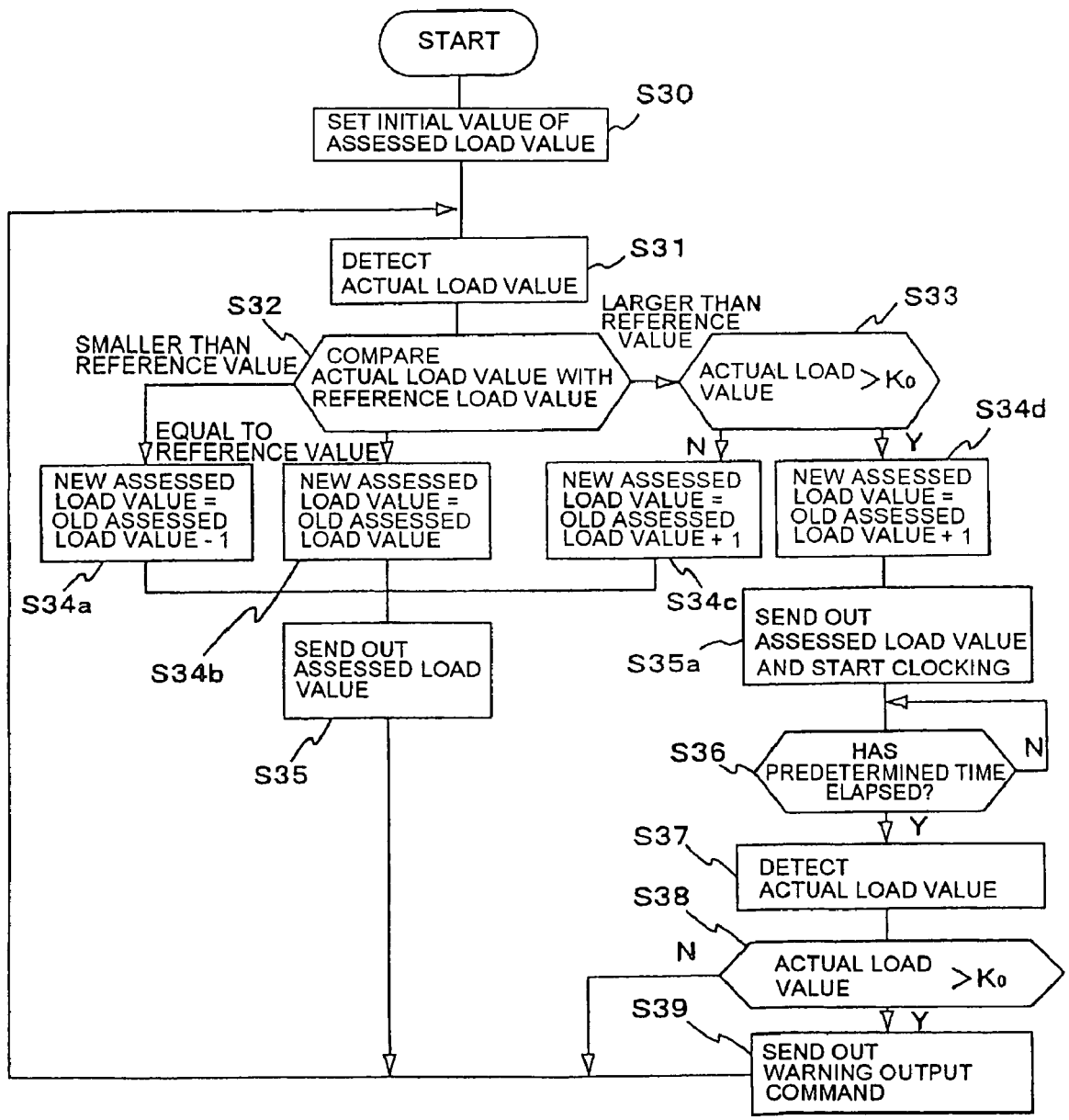
FIG. 13 is a flowchart showing a variation of the operation of the AP according to the first embodiment of the present invention.

Next, a variation of the operation of the AP 50 described with reference to FIG. 4 will be described with reference to a flowchart in FIG. 13.

First, the load detector 52 sets an initial value of the assessed load value (S30). The initial value is set, for example, to "0" (equivalent to an actual load value of 40%). Next, the load detector 52 detects the actual load value of the AP 50 (S31) and compares it with a reference load value to see which is larger (S32). The reference load value may be set, for example, to "40%". If the actual load value is smaller than the reference load value, the load detector 52 sets a new assessed load value by subtracting 1 from the old assessed load value (S34a). If the actual load value is equal to the reference load value, the load detector 52 uses the old assessed load value directly as a new assessed load value (S34b). If the actual load value is larger than the reference load value, the determinator 53 determines whether the actual load value is larger than a predetermined value $K_0$ (S33). The predetermined value $K_0$ is such that further increases in the communication load can obstruct wireless communication of the AP 50. For example, "60%" is adopted here as the predetermined value $K_0$. The load detector 52 sets a new assessed load value by adding 1 to the old assessed load value regardless of whether the actual load value is larger than the predetermined value $K_0$ or not (S34d and S34c). That is, the processes in Steps 34a to 34d convert the actual load value into an assessed load value. Incidentally, the determination process in Step 33 corresponds to the determination process in Step 4 of FIG. 4.

When Step 34a, 34b, and 34c are finished, the beacon frame generator 54 generates a beacon frame containing the assessed load value on instructions from a controller 56 and passes the beacon frame to the wireless transmitter 61 in order for the beacon frame to be wirelessly transmitted (S35), and the flow returns to Step 31.

When Step 34d is finished, the beacon frame generator 54 generates a beacon frame containing the assessed load value on instructions from a controller 56 and passes the beacon frame to the wireless transmitter 61 in order for the beacon frame to be wirelessly transmitted. The controller 56 starts counting time upon completion of the wireless transmission of the beacon frame (S35a). The controller 56 determines whether a predetermined time has elapsed from the start of clocking (S36). The predetermined time, which is counted from the time the load value is transmitted to wireless stations (S35a), has a duration long enough for the wireless stations which receive the load value to switch the connection target AP.

If the predetermined time has elapsed from the start of clocking, the load detector 52 detects the actual load value again (S37). The determinator 53 determines whether the actual load value is larger than the predetermined value $K_0$ (S38). Incidentally, the value $K_0$ of the threshold used in the determination here is the same as the value used in Step 33, but a different value may be used. If the actual load value is smaller than $K_0$, it is determined that the load on the AP 50 has been reduced due to the transmission of the assessed load value to the wireless stations in Step 35a, and the flow returns to Step 31. On the other hand, if the actual load value is larger than $K_0$, it is determined that the load on the AP 50 has not been reduced despite the transmission of the assessed load value to the wireless stations in Step 35a, and the controller 56 is notified thereof. Upon receiving the notification, the controller 56 gives instructions to the beacon frame generator 54. The beacon frame generator 54 enters information in the vacant field of a beacon frame, passes the beacon frame to the wireless transmitter 61, and makes the wireless transmitter 61 transmit the beacon frame to connected wireless stations as a beacon signal (S39), where the information entered in the vacant field is a warning output command which instructs the connected wireless stations to output a warning prompting their users to move from their current locations and information that the warning output command is addressed to the connected wireless stations. After the transmission of the warning output command, the flow returns to Step 31 again.

Thus, according to this variation, as in the case of the above embodiment, if the communication load value of the AP continues to exceed the threshold $K_0$ without reduction in the communication load even after a lapse of a predetermined time, a warning output command is included in a beacon. On the other hand, according to this variation, if there is an increase or decrease in the actual load value, the assessed load value increased or decreased by a unit quantity is reported to the wireless stations instead of informing the wireless stations of the assessed load value equivalent to the actual load value as in the case of the above embodiment. Consequently, even if the actual load value changes abruptly, the assessed load value sent to the wireless stations does not change abruptly, and thus it is possible to prevent a large number of wireless stations from switching their connection target abruptly. This reduces the load applied on the AP when wireless stations switch to the AP.

Figure 14:
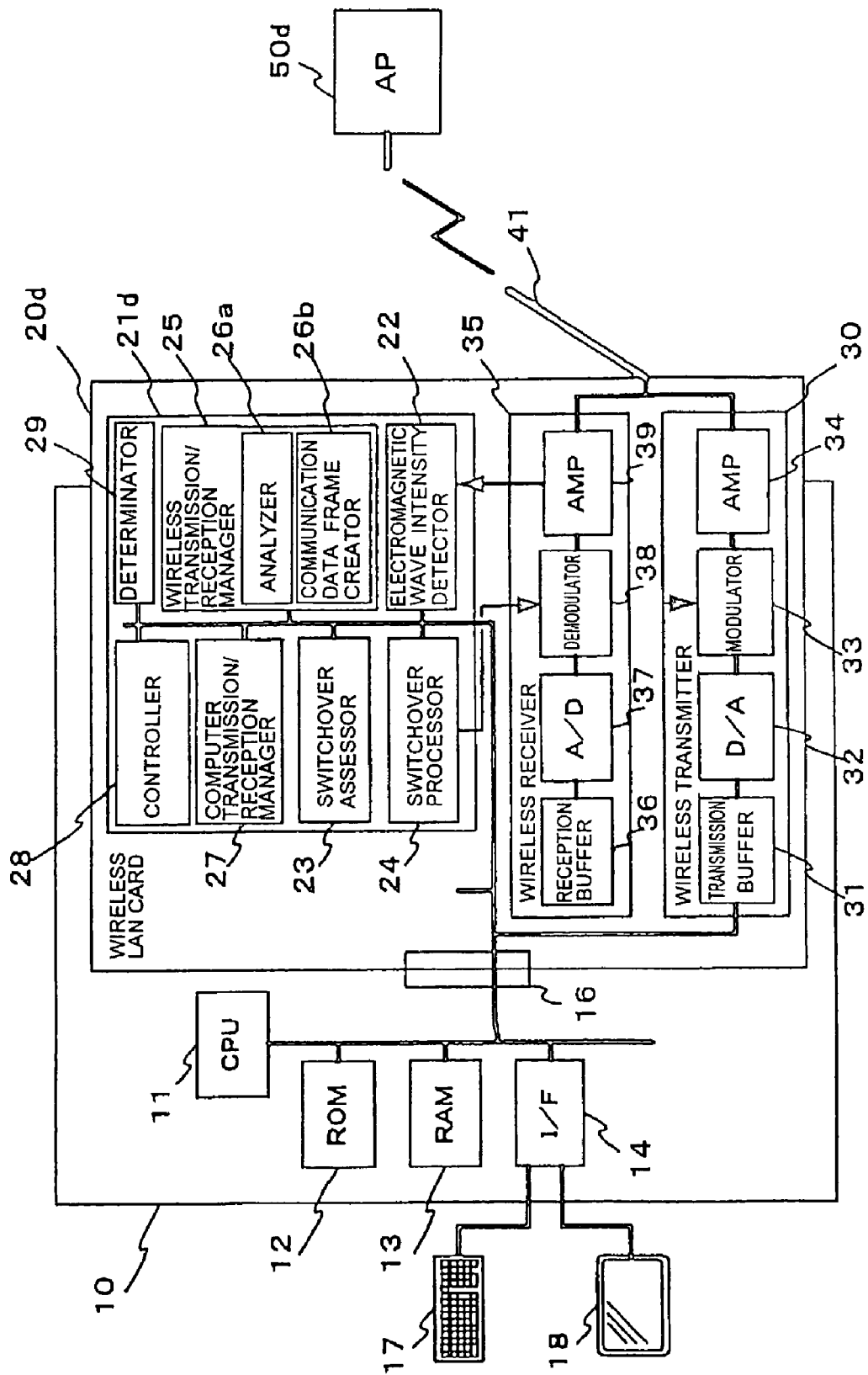
FIG. 14 is a functional block diagram of a wireless station (wireless LAN card) according to a second embodiment of the present invention.

Next, a wireless LAN system which is a second embodiment will be described with reference to FIGS. 14 to 13.

Figure 15:
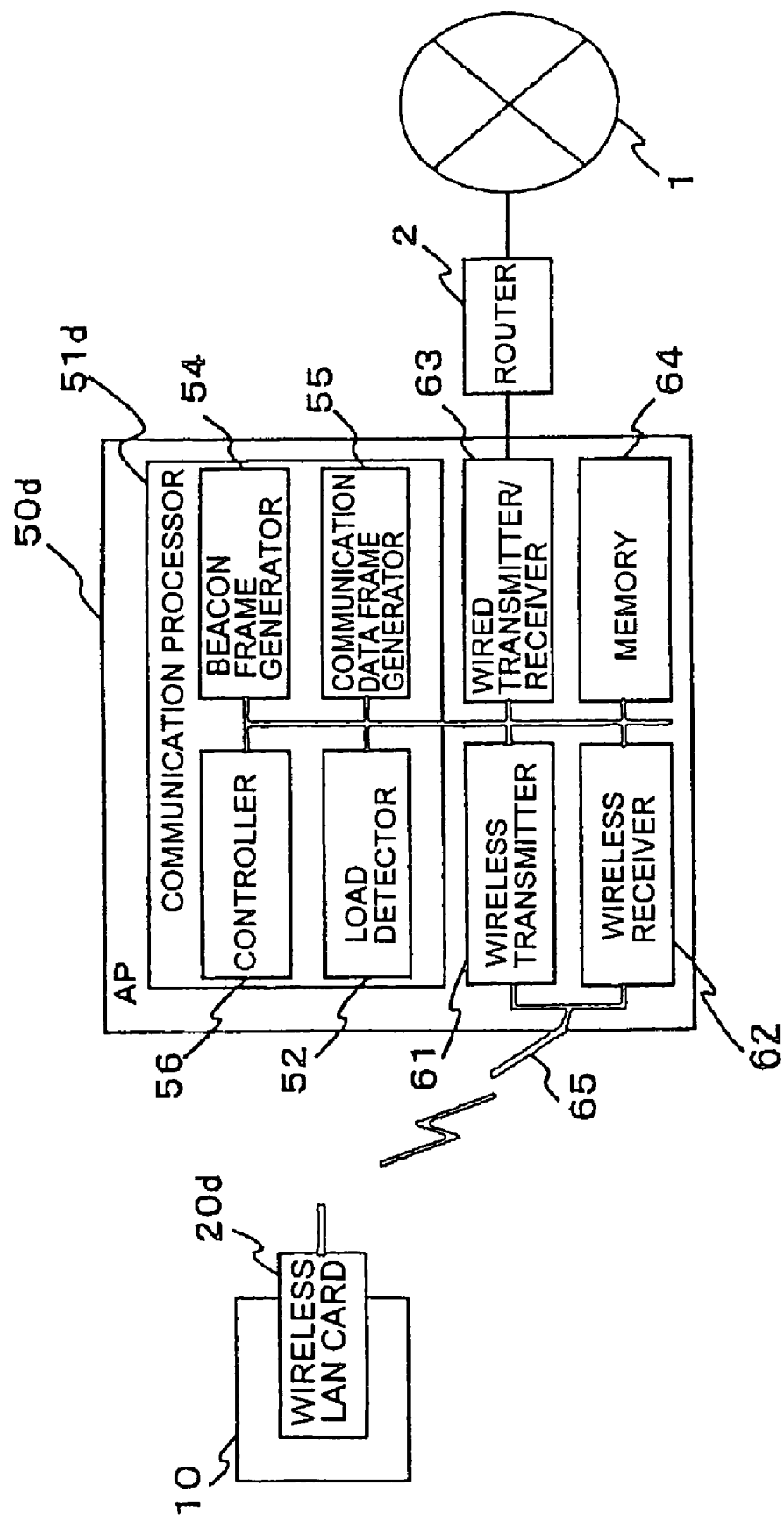
FIG. 15 is a functional block diagram of an access point (AP) according to the second embodiment of the present invention.

According to this embodiment, the wireless station determines for itself whether to output a warning prompting its user to move from the current location whereas according to the first embodiment, a similar determination is made by the AP. Thus, as shown in FIG. 15, a communication processor 51d of an AP 50d according to this embodiment does not have a determinator such as the determinator 53 (FIG. 3) according to the first embodiment. Instead, a communication processor 21d of a wireless LAN card 20d which is a wireless station has a determinator 29 as shown in FIG. 14. Otherwise, the configuration of the AP 50d and wireless LAN card 20d is basically the same as the first embodiment.

Figure 16:
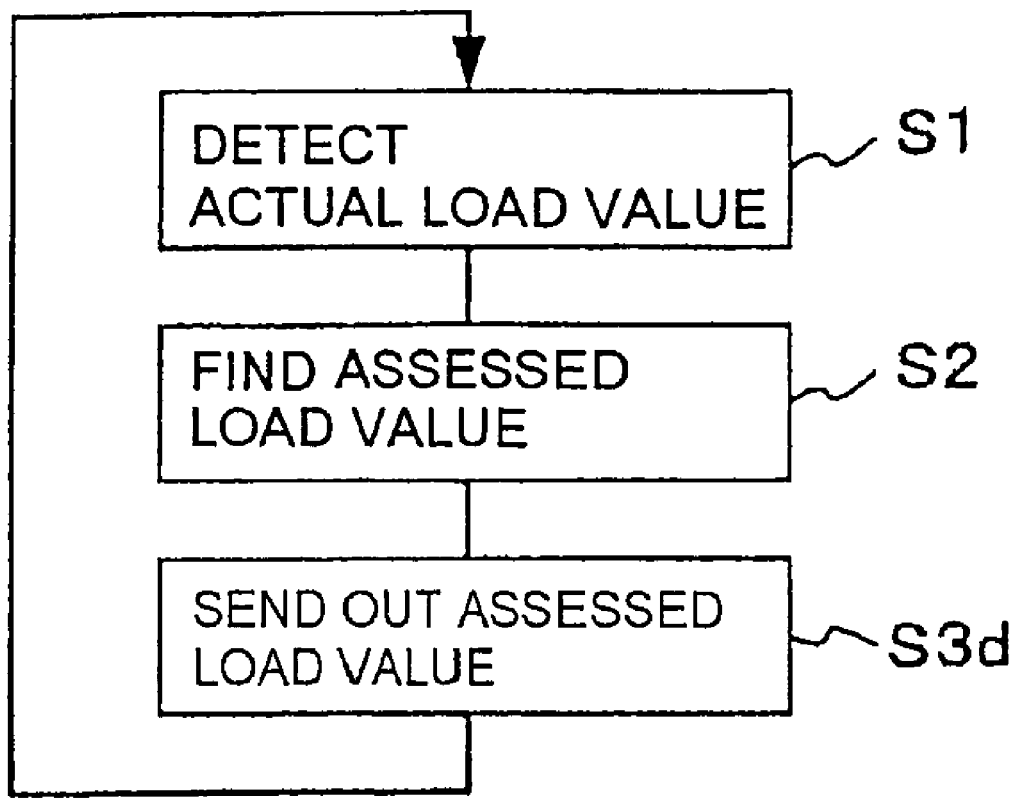
FIG. 16 is a flowchart showing operation of the AP according to the second embodiment of the present invention.

Next, operation of the AP 50d according to this embodiment will be described with reference to a flowchart in FIG. 16. Incidentally, this flowchart corresponds to the flowchart in FIG. 4 which shows the operation of the AP according to the first embodiment.

First, as in the case of the first embodiment, the load detector 52 of the AP 50d detects the communication load of the AP 50 (S1) and converts it into an assessed load value (S2). Next, on instructions from the controller 56, the beacon frame generator 54 generates a beacon frame containing the assessed load value and passes the beacon frame to the wireless transmitter 61 in order for the beacon frame to be transmitted (S3d). Then, the flow returns to Step 1.

Whereas according to the first embodiment, the wireless transmission of the beacon frame (S3) is followed by the determination as to whether the assessed load value of the AP exceeds a predetermined value (S4), determination as to whether a predetermined time has elapsed since the transmission of the assessed load value (S5), second detection of the actual load value (S6), second determination as to whether the assessed load value of the AP exceeds the predetermined value (S7 and S8), and transmission of a warning output command (S9), the AP 50*d* according to this embodiment skips Steps 4 to 9.

According to this embodiment, as is the case with the variation (FIG. 13) of the AP according to the first embodiment, an assessed load value increased or decreased by a unit quantity with an increase or decrease in the detected load value may be transmitted to wireless stations instead of transmitting the detected load value as it is to the wireless stations.

Figure 17:
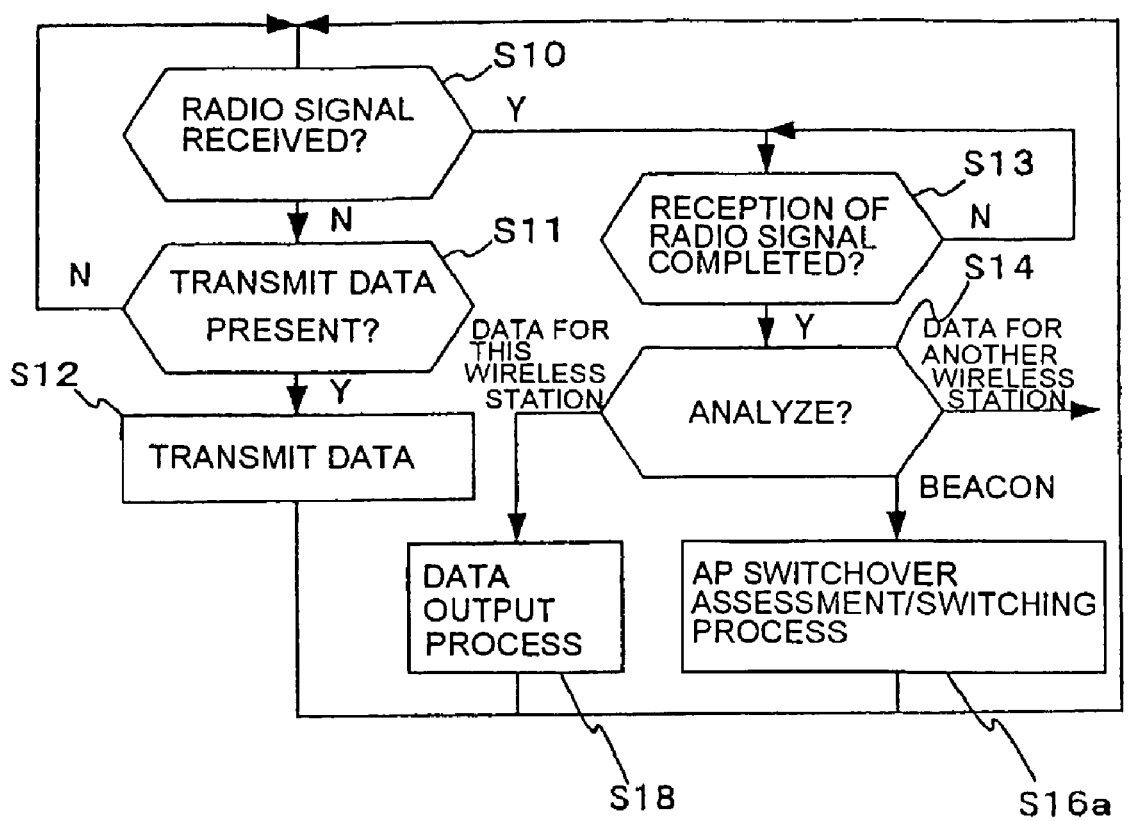
FIG. 17 is a flowchart showing operation of the wireless station according to the second embodiment of the present invention.

Next, operation of the wireless station 20*d* will be described with reference to a flowchart in FIG. 17. Incidentally, this flowchart corresponds to the flowchart in FIG. 5 which shows the operation of the wireless station 20 according to the first embodiment.

As is the case with the first embodiment, this embodiment involves a determination as to whether a radio signal is received (S10), determination as to whether there are transmit data (S11), transmission of the data (S12), determination as to whether reception of the radio signal is complete (S13), analysis of the radio signal (S14), output process of data from the radio signal in the case where the received radio signal is addressed to the wireless station itself (S18.

Incidentally, whereas according to the first embodiment, if the analysis of the radio signal (S14) reveals that the received radio signal is a beacon, it is determined whether the beacon contains a warning output command (S15) and a warning is outputted if the beacon contains a warning output command (S17); according to this embodiment, if the analysis of the radio signal (S14) reveals that the received radio signal is a beacon, an AP switchover assessment/switching process (S11*a*) is performed immediately and this process (S16*a*) includes a determination as to whether to output a warning and a warning output process as described later.

Figure 18:
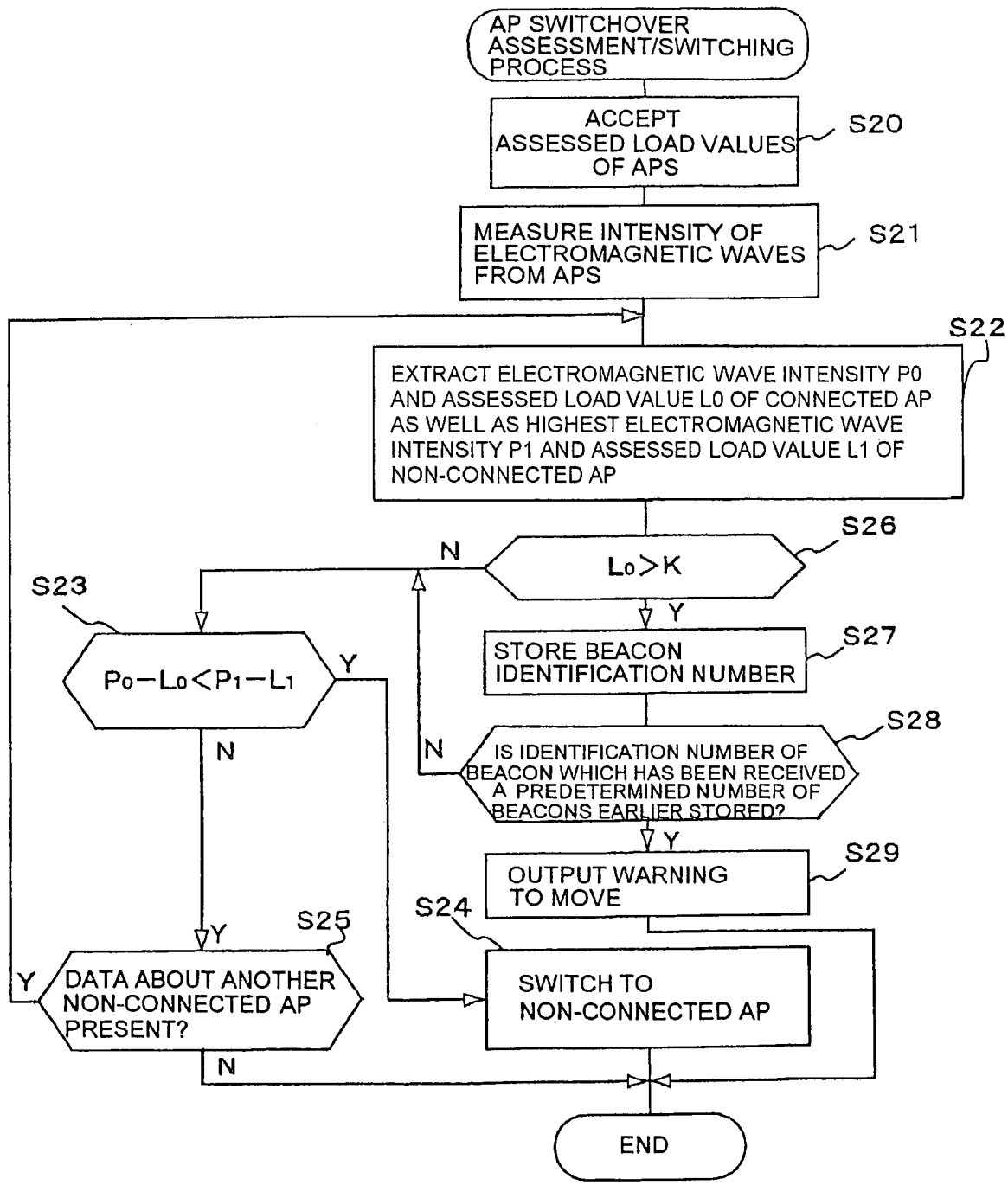
FIG. 18 is a flowchart showing details of an AP switchover assessment/switching process according to the second embodiment of the present invention.

Next, details of the AP switchover assessment/switching process (S16*a*) according to this embodiment will be described with reference to a flowchart in FIG. 18. Incidentally, this flowchart corresponds to the flowchart in FIG. 6 which shows details of the AP switchover assessment/switching process (S16) according to the first embodiment.

As is the case with the first embodiment, this embodiment involves accepting the assessed load values of APs (S20), measuring the intensity of the electromagnetic waves received from the APs (S21), and extracting the electromagnetic wave intensity $P_0$ and assessed load value $L_0$ of the connected AP as well as the highest electromagnetic wave intensity $P_1$ and assessed load value $L_1$ of the non-connected AP which gives the highest electromagnetic wave intensity (S22).

Next, the determinator 29 of the wireless station 20*d* which is characteristic of this embodiment determines whether the assessed load value $L_0$ of the AP 50*d* is larger than a predetermined value K (S26). As is the case with the first embodiment, if the assessed load value $L_0$ of the AP 50*d* is not larger than the predetermined value K, the switchover assessor 23 determines whether the difference $(P_0-L_0)$ between the electromagnetic wave intensity $P_0$ and assessed load value $L_0$ of the connected AP 50*d* is larger than the difference $(P_1-L_1)$ between the electromagnetic wave intensity $P_1$ and assessed load value $L_1$ of the non-connected AP (S23). If the equivalent electromagnetic wave intensity of the non-connected AP is larger, the switchover assessor 23 determines that it is preferable to switch to the non-connected AP and instructs the switchover processor 24 to switch to the non-connected AP (S24). On the other hand, if the equivalent electromagnetic wave intensity of the non-connected AP is not larger, the switchover assessor 23 determines whether there are data about another non-connected AP (S25). If there is no data about another non-connected AP, the switchover assessor 23 terminates its processing, but if there are data about another non-connected AP, the switchover assessor 23 returns to Step 22.

On the other hand, if the determinator 29 determines in Step 26 that the assessed load value $L_0$ of the AP 50*d* is larger than the predetermined value K, it stores an identification number of the beacon containing the assessed load value $L_0$ (S27). The identification number of the beacon has been set in one of the "parameters defined by information elements" contained in the beacon frame. Then, the determinator 29 determines whether the identification number of the beacon which has been received a predetermined number of beacons earlier is stored (S28). Beacons are sent out periodically. Therefore, if the identification number of the beacon which has been received the predetermined number of beacons earlier is stored, it can be said that the assessed load value contained in the beacon a predetermined time earlier (one beacon period×a predetermined number of time) is also larger. Thus, if the identification number of the beacon which has been received a predetermined number of beacons earlier is stored, the determinator 29 determines that the communication load of the AP 50*d* has not been reduced since wireless stations received the assessed load value contained in the beacon which had been received a predetermined number of beacons earlier and notifies the controller 28 thereof. Upon receiving the notification, the controller 28 gives instructions to the computer transmission/reception manager 27. Then, the computer transmission/reception manager 27 sends predetermined display data such as "move away from your current location" to the computer 10 in which the wireless station 20*d* is inserted and makes the computer 10 display the data (S29).

On the other hand, if it is determined in Step 28 that the identification number of the beacon which has been received a predetermined number of beacons earlier is not stored, the determinator 29 goes to Step 23.

Thus, according to this embodiment, as in the case of the first embodiment, if the communication load value of the AP continues to exceed the threshold K without reduction in the communication load even after a lapse of a predetermined time, the wireless station outputs a warning prompting its user to move from the current location.

As the threshold of the electromagnetic wave intensity for use to determine whether to switch the connection target, this embodiment may employ a function such as $F(L_1-L_0)$ as in the case of the first variation of the AP switchover assessment/switching process or a fixed value as in the case of the second variation.

Figure 19:
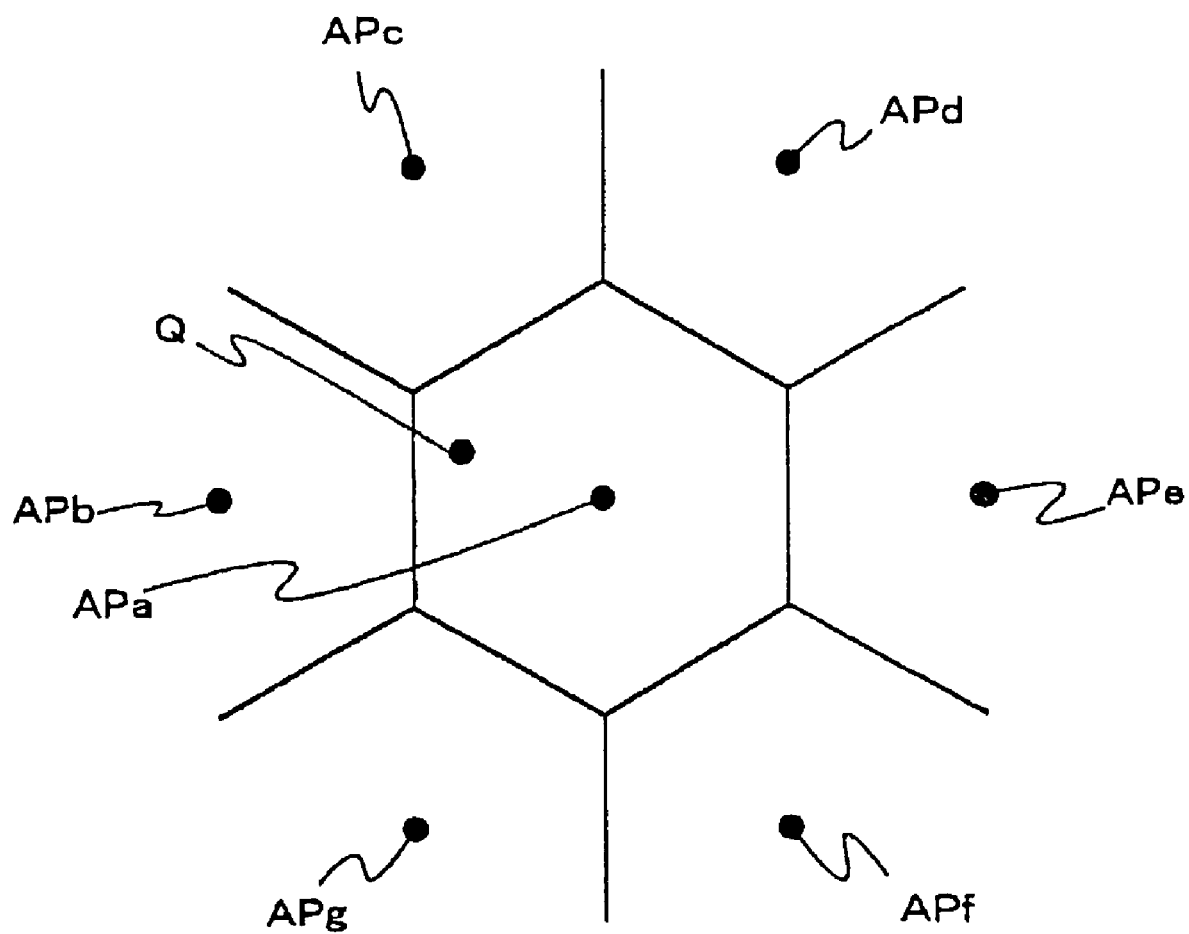
FIG. 19 is an explanatory diagram illustrating arrangement of multiple APs in relation to each other.

Incidentally, although switchover from one to the other of two APs has been described in the above embodiments, actually there are multiple access points APb, APc, . . . around an access point APa as shown in FIG. 19, and if a wireless station connected to APa is located at point Q, data about APb with the highest electromagnetic wave intensity is extracted from the non-connected access points APb and APc in Step 22 of FIGS. 6, 8, 11, and 18 and it is determined which of the two, APb and APa (currently connected), the wireless station will be connected to, and if the wireless station is not connected to APb, APc with the second highest electromagnetic wave intensity after APb is extracted and it is determined which of the two, APc and APa (currently connected), the wireless station will be connected to.

What is claimed is:

1. An access point for a wireless communication system which comprises wireless communication means for wireless communications with wireless stations and which relays communications between the wireless stations and other stations, comprising:

load detecting means for detecting communication load values of communications currently in progress with the wireless stations;

transmission directing means for instructing the wireless communication means to transmit a first communication load value detected by the load detecting means; and determination means for determining whether the first communication load value is larger than a first predetermined value and, if the first communication load value is larger than the first predetermined value, whether a second communication load value detected by the load detecting means a predetermined time after the first communication load value is transmitted by the wireless communication means is larger than a second predetermined value, wherein, if the determination means determines that the second communication load value is larger than the second predetermined value, the transmission directing means instructs the wireless communication means to transmit a warning output command instructing the wireless stations to output a warning to move from current locations in order to maintain the communications currently in progress, wherein the wireless stations comprise the wireless communication means for wireless communication with the access point, and wherein each of the wireless stations comprises:

electromagnetic wave intensity detecting means for detecting intensity of electromagnetic waves received from the access point by the wireless communication means;

switchover assessing means for determining whether to switch to another access point by a predetermined method, based on the electromagnetic wave intensity and communication load value of a currently connected access point and the electromagnetic wave intensity and communication load value of the other access point;

switching means for switching to the other access point if the switchover assessing means determines to switch to the other access point; and warning means for producing a warning output based on the warning output command if the wireless communication means receives the warning output command from the access point.

2. The access point according to claim 1, wherein, as the communication load values, the load detecting means detects any one of the number of wireless stations connected to the access point, availability of a central processing unit used by the access point to perform communication processing, and communication traffic of the access point.

3. The access point according to claim 1, wherein the load detecting means detects an actual communication load value of communications with the wireless stations, compares the actual communication load value with a predetermined reference load value, increases or decreases a communication load value passed in advance to the transmission directing means by a predetermined unit quantity depending on whether the actual communication load value is larger or smaller than the predetermined reference load value, and passes the increased/decreased communication load value to the transmission directing means as a new communication load value.

4. A wireless communication system comprising:

the access point according to claim 3; and a plurality of the wireless stations each of which includes wireless communication means for wireless communication with the access point.

5. The wireless communication system according to claim 4, wherein each of the wireless stations comprises:

electromagnetic wave intensity detecting means for detecting intensity of electromagnetic waves received from the access point by the wireless communication means;

switchover assessing means for determining whether to switch to another access point by a predetermined method, based on the electromagnetic wave intensity and communication load value of a currently connected access point and the electromagnetic wave intensity and communication load value of the other access point;

switching means for switching to the other access point if the switchover means determines to switch to the other access point; and warning means for producing a warning output based on the warning output command if the wireless communication means receives the warning output command from the access point.

6. The access point of claim 1, wherein the first predetermined value and the second predetermined value are equal to one another.

7. An access point for a wireless communication system which comprises wireless communication means for wireless communications with wireless stations and which relays communications between the wireless stations and other stations, comprising:

means for setting an initial value of an assessed load value;

load detecting means for detecting communication load values of communications currently in progress with the wireless stations; and transmission directing means for instructing the wireless communication means to transmit an obtained assessed load value;

wherein the load detecting means detects an actual communication load value of communications currently in progress with the wireless stations, compares the actual communication load value with a first predetermined reference load value, increases or decreases the assessed load value passed in advance to the transmission directing means by a predetermined unit quantity depending on whether the actual communication load value is larger or smaller than the first predetermined reference load value, and passes the increased/decreased communication load value to the transmission directing means as a new assessed load value and instructs the wireless communication means to transmit the new assessed load value, wherein the wireless stations comprise the wireless communication means for wireless communication with the access point, and wherein each of the wireless stations comprises:

electromagnetic wave intensity detecting means for detecting intensity of electromagnetic waves received from the access point by the wireless communication means;

switchover assessing means for determining whether to switch to another access point by a predetermined method, based on the electromagnetic wave intensity and communication load value of a currently connected access point and the electromagnetic wave intensity and communication load value of the other access point;

switching means for switching to the other access point if the switchover assessing means determines to switch to the other access point; and warning means for producing a warning output based on the warning output command if the wireless communication means receives the warning output command from the access point.

8. A wireless station for a wireless communication system which comprises wireless communication means, which wireless station communicates wirelessly with an access point currently connected to the wireless station using the wireless communication means, the access point having a function to output a warning output command to the wireless station when a communication load value for a communication currently in progress with the wireless station is increased, and which communicates with other wireless stations via the access point, comprising:

analysis means for analyzing data included in electromagnetic waves received from the access point by the wireless communication means and for analyzing whether the data includes the warning output command which instructs the wireless station to output a warning promoting to move from its current location;

warning output means for performing a move warning indication if the data includes the warning output command;

obtaining means for obtaining electromagnetic wave intensity and communication load value of the currently connected access point by analyzing data included in a wave received with the wireless communication means from the access point if the analysis means determines that there is no warning output command in the received data as well as obtaining an electromagnetic wave intensity and communication load value of another access point not currently connected to the wireless station;

switchover assessing means for determining whether to switch a connection subject to another access point by a predetermined assessment order using electromagnetic wave intensity and communication load value from a currently connected access point which the obtaining means obtained and electromagnetic wave intensity and communication load value from said other access point; and switching means for switching a connection subject to the other access point if the switchover assessing means determines to switch to the other access point, wherein the wireless station further comprises:

electromagnetic wave intensity detecting means for detecting intensity of electromagnetic waves received from the access point by the wireless communication means;

switchover assessing means for determining whether to switch to another access point by a predetermined method, based on the electromagnetic wave intensity and communication load value of a currently connected access point and the electromagnetic wave intensity and communication load value of the other access point;

switching means for switching to the other access point if the switchover assessing means determines to switch to the other access point; and warning means for producing a warning output based on the warning output command if the wireless communication means receives the warning output command from the access point.

9. The wireless station according to claim 8, wherein the switchover assessing means determines whether to switch to the other access point based on a magnitude relationship between the communication load value of the currently connected access point and the communication load value of the other access point as well as on whether the electromagnetic wave intensity of the other access point is higher than a predetermined threshold.

10. A wireless communication system comprising;

the wireless station according to claim 8; and the access point which comprises the wireless communication means for wireless communication with the wireless station.

11. A wireless station for a wireless communication system which comprises wireless communication means, which wireless station communicates wirelessly with an access point currently connected to the wireless station using the wireless communication means, and which communicates with other wireless stations via the access point, comprising:

analysis means for analyzing data contained in electromagnetic waves received from the access point by the wireless communication means and obtaining communication load values of the access point from the received data for a communication currently in progress of the wireless station;

electromagnetic wave intensity detecting means for detecting intensity of electromagnetic waves received from the access point by the wireless communication means;

switchover assessing means for determining whether to switch to another access point, based on the electromagnetic wave intensity and communication load value of the currently connected access point and the electromagnetic wave intensity and communication load value of the other access point; and switching means for switching to the other access point if the switchover means determines to switch to the other wireless station, wherein the switchover assessing means determines whether to switch to the other access point based on a magnitude relationship between the communication load value of the currently connected access point and the communication load value of the other access point as well as on whether the electromagnetic wave intensity of the other access point is higher than a predetermined threshold which is determined using the communication load value of the currently connected access point and the communication load value of the other access point as variables, wherein the wireless station further comprises:

electromagnetic wave intensity detecting means for detecting intensity of electromagnetic waves received from the access point by the wireless communication means;

switchover assessing means for determining whether to switch to another access point by a predetermined method, based on the electromagnetic wave intensity and communication load value of a currently connected access point and the electromagnetic wave intensity and communication load value of the other access point;

switching means for switching to the other access point if the switchover assessing means determines to switch to the other access point; and warning means for producing a warning output based on the warning output command if the wireless communication means receives the warning output command from the access point.

12. The wireless communication system according to claim 11, wherein the access point comprises:
- load detecting means for detecting communication load values of communications with the wireless stations; and
- transmission directing means for instructing the wireless communication means to transmit a first communication load value detected by the load detecting means.

13. A communication load balancing method for an access point of a wireless communication system which relays communications between wireless stations and other stations, comprising:
- a first load detecting step of detecting a first communication load value of communication currently in progress with the wireless stations;
- a load value transmitting step of transmitting the first communication load value to the wireless stations;
- determining whether the first communication load value detected in the first load detecting step is larger than a first predetermined value, and, if the first communication load value is larger than the first predetermined value, a second load detecting step of detecting a second communication load value of communications with the wireless stations a predetermined time after the first communication load value is transmitted by the load value transmitting step;
- a determination step of determining whether the second communication load value is larger than a second predetermined value; and
- a command transmitting step of transmitting a warning output command instructing the wireless stations to output a warning to move from current locations to maintain the communication currently in progress, if the determination means determines that the second communication load value is larger than the second predetermined value,
- wherein the wireless stations comprise a wireless communication means for wireless communication with the access point, and
- wherein each of the wireless stations performs the following steps:
- detecting intensity of electromagnetic waves received from the access point by the wireless communication means;
- determining whether to switch to another access point by a predetermined method, based on the electromagnetic wave intensity and communication load value of a currently connected access point and the electromagnetic wave intensity and communication load value of the other access point;
- switching to the other access point if the switchover determining step determines to switch to the other access point; and
- producing a warning output based on the warning output command if the wireless communication means receives the warning output command from the access point.

14. The method according to claim 13, wherein the first predetermined value and the second predetermined value are equal to one another.

15. An access point communication load balancing method for a wireless station of a wireless communication system which wireless station communicates with another station via an access point, wherein the access point has a function to output a warning output command to the wireless station when a communication load value for a communication currently in progress with the wireless station is increased, the method comprising:
- an analyzing step for analyzing data included in electromagnetic waves received from the access point by a wireless communication means and analyzing whether the data includes the warning output command which instructs the connected wireless station to output a warning promoting to move from a current location to maintain the communication currently in progress;
- a warning output step for performing a move warning indication if the analysis means determines that the data includes the warning output command;
- an obtaining step for obtaining electromagnetic wave intensity and communication load value of a currently connected access point by analyzing data included in the electromagnetic wave received with the wireless communications means from the access point if the analysis means determines that there is no warning output command in the data as well as obtaining electromagnetic wave intensity and communication load value of another access point which is not currently connected to the wireless stations;
- a switchover assessing step for determining whether to switch a connection subject to said another access point by a predetermined assessment order using electromagnetic wave intensity and communication load value from the currently connected access point which the obtaining means obtained and electromagnetic wave intensity and communication load value from said other access point; and
- a switching step for switching a connection subject to said another access point if the switchover assessing means determines to switch to said another access point,
- wherein the wireless station performs the following steps:
- detecting intensity of electromagnetic waves received from the access point by the wireless communication means;
- determining whether to switch to another access point by a predetermined method, based on the electromagnetic wave intensity and communication load value of a currently connected access point and the electromagnetic wave intensity and communication load value of the other access point;
- switching to the other access point if the switchover determining step determines to switch to the other access point; and
- producing a warning output based on the warning output command if the wireless communication means receives the warning output command from the access point.

* * * * *